(12) United States Patent
Shibata et al.

(10) Patent No.: US 7,826,669 B2
(45) Date of Patent: Nov. 2, 2010

(54) IMAGE PROCESSING DEVICE, IMAGE PROCESSING METHOD, INFORMATION PROCESSING DEVICE, INFORMATION PROCESSING METHOD, INFORMATION RECORDING DEVICE, INFORMATION RECORDING METHOD, INFORMATION REPRODUCTION DEVICE, INFORMATION REPRODUCTION METHOD, RECORDING MEDIUM AND PROGRAM

(75) Inventors: Shojiro Shibata, Kanagawa (JP); Goro Kato, Kanagawa (JP); Hiromichi Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 942 days.

(21) Appl. No.: 10/560,865

(22) PCT Filed: Jun. 9, 2004

(86) PCT No.: PCT/JP2004/008395

§ 371 (c)(1),
(2), (4) Date: Dec. 14, 2005

(87) PCT Pub. No.: WO2004/112397

PCT Pub. Date: Dec. 23, 2004

(65) Prior Publication Data

US 2006/0133674 A1    Jun. 22, 2006

(30) Foreign Application Priority Data

Jun. 16, 2003    (JP) .......................... P2003-170724

(51) Int. Cl.
*G06K 9/36* (2006.01)
*H04B 1/66* (2006.01)

(52) U.S. Cl. ....................................... 382/232; 375/260

(58) Field of Classification Search ......... 382/232–253; 375/240, 240.01–240.29
See application file for complete search history.

(56) References Cited

U.S. PATENT DOCUMENTS 5,544,266 A    8/1996    Koppelmans et al.

(Continued)

FOREIGN PATENT DOCUMENTS

EP    0 637 893    2/1995

(Continued)

OTHER PUBLICATIONS

Wilkinson J: "Understanding MPEG Concatenation and Transcoding" ABU Technical Review, Asian Broadcasting Union, Kuala Lumpur, MW, No. 177, Jul. 1, 1998, pp. 3-09, XP000992282 ISSN: 0126-6209.

(Continued)

*Primary Examiner*—Vu Le
*Assistant Examiner*—Alex Liew
(74) *Attorney, Agent, or Firm*—Frommer Lawrence & Haug LLP; William S. Frommer; Thomas F. Presson

(57) ABSTRACT

A system for coding an I-picture that satisfies a predetermined condition using parameter information. When it is determined that a picture type is the I-picture, it is determined whether or not the phase of a macro block in previous coding agrees with that of the macro block of present coding. When the phases of the macro blocks agree with each other, it is determined whether or not amount of generated code in a unit of picture in decoding $\leq$ target amount of code$\times\alpha$ is satisfied. When the condition is satisfied, it is determined whether or not an image frame of previous coding is the same as that of previous coding. When the image frames are not the same, the information of a picture type, motion vector, and a quantized value included in the parameter information is reused, whereas when the image frames are the same, the stream data input to a decoder is output. When the above condition is not satisfied, the parameters are not reused. The present invention can be applied to a coder, a coding apparatus, an information recording apparatus, an information reproducing apparatus, or a transcoder.

13 Claims, 17 Drawing Sheets

U.S. PATENT DOCUMENTS

| | | | |
|---|---|---|---|
| 5,623,424 | A | 4/1997 | Azadegan et al. |
| 5,754,235 | A | 5/1998 | Urano et al. |
| 5,774,593 | A * | 6/1998 | Zick et al. .................. 382/236 |
| 5,991,452 | A * | 11/1999 | Shimizu et al. ............. 382/248 |
| 6,445,828 | B1 * | 9/2002 | Yim ........................... 382/250 |
| 6,856,650 | B1 * | 2/2005 | Takishima et al. .......... 375/240 |
| 7,126,993 | B2 * | 10/2006 | Kitamura et al. ....... 375/240.26 |
| 2001/0006562 | A1 | 7/2001 | Tajime |
| 2002/0181595 | A1 | 12/2002 | Obata et al. |

FOREIGN PATENT DOCUMENTS

| | | |
|---|---|---|
| EP | 0 982 726 | 3/2000 |
| EP | 1 069 779 | 1/2001 |
| JP | 7-95090 | 4/1995 |
| JP | 7-312756 | 11/1995 |
| JP | 11-313331 | 11/1999 |
| JP | 2000-299857 | 10/2000 |
| JP | 2001-186517 | 7/2001 |
| JP | 2002 320228 | 10/2002 |
| WO | WO 00/48402 | 8/2000 |

OTHER PUBLICATIONS

Tudor P N et al: "Real-Time Transcoding of MPEG-2 Video Bit Streams" International Broadcasting Convention, London, GB, No. 447, Sep. 1, 1997, pp. 296-301, COMPL, XP000668774.

Oliver Morgan (SMPTE): "SMPTE 328M Video Elementary Stream Editing Information" Joint Video Team (JVT) of ISO/IEC MPEG & ITU-T VCEG(ISO/IEC JTC1/SC29/WG11 and ITU-T SG16 Q6), XX, XX, No. M5924 Mar. 14, 2000, XP030035101.

* cited by examiner

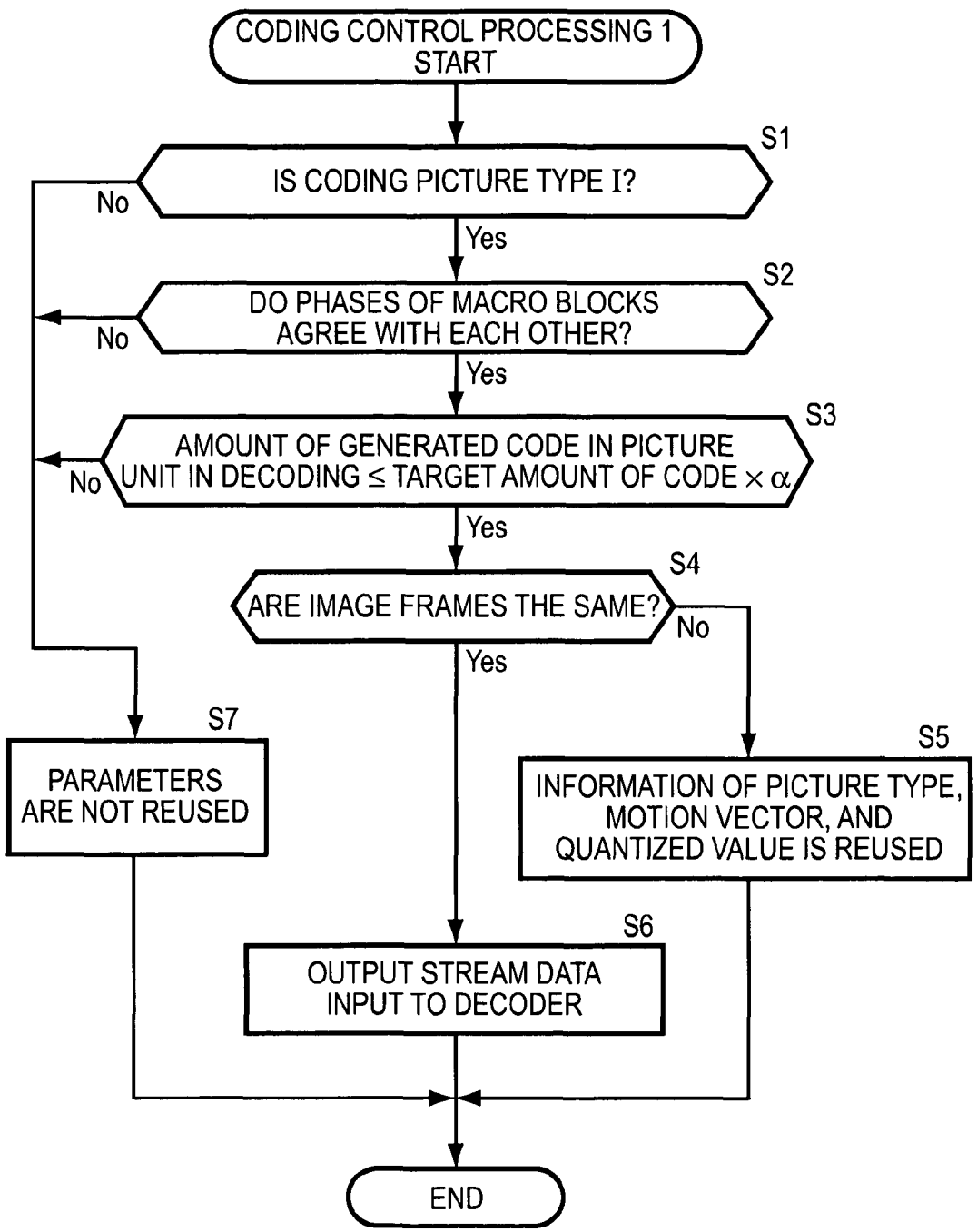

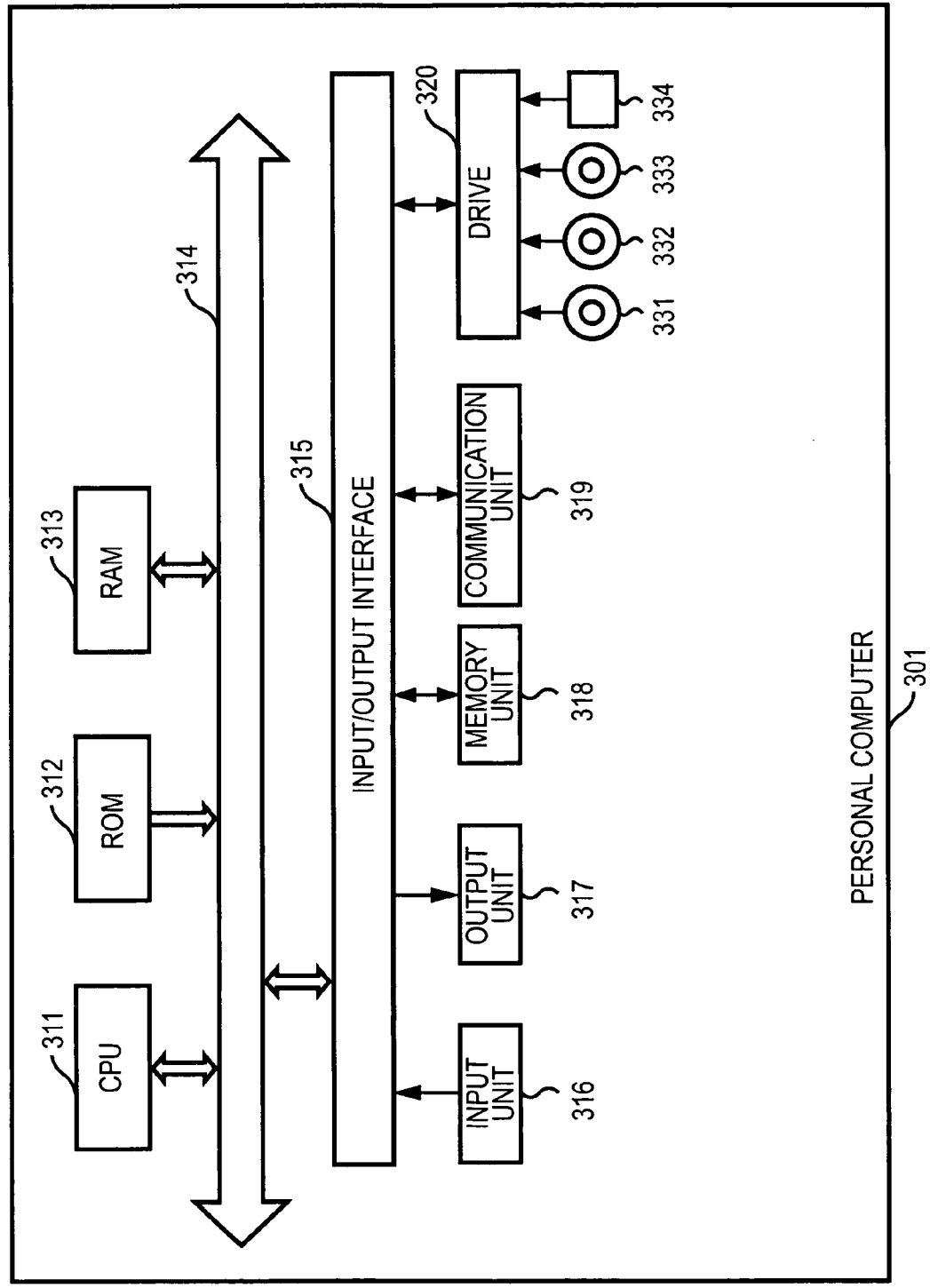

IMAGE PROCESSING DEVICE, IMAGE PROCESSING METHOD, INFORMATION PROCESSING DEVICE, INFORMATION PROCESSING METHOD, INFORMATION RECORDING DEVICE, INFORMATION RECORDING METHOD, INFORMATION REPRODUCTION DEVICE, INFORMATION REPRODUCTION METHOD, RECORDING MEDIUM AND PROGRAM

TECHNICAL FIELD

The present invention relates to an image processing apparatus and an image processing method, an information processing apparatus and an information processing method, an information recording apparatus and an information recording method, an information reproducing apparatus and an information reproducing method, a recording medium, and a program. More particularly, the present invention relates to an image processing apparatus and an image processing method, an information processing apparatus and an information processing method, an information recording apparatus and an information recording method, an information reproducing apparatus and an information reproducing method, a recording medium, and a program which can be preferably applied to a case in which recoding can be executed using information as to coding executed to corresponding data in the past.

BACKGROUND ART

In systems such as a TV conference system, a TV phone system, and the like in which a motion image signal is transmitted to a distant place, the image signal is compressed and coded making use of the line-to-line correlation and the interframe correlation of a video signal to effectively utilize a transmission path.

When an image signal is compressed and coded, it is coded so that a created bit stream has a predetermined bit rate. However, in a practical operation, it may necessary to change the bit rate of the bit stream for the convenience of the transmission path.

Further, when, for example, a transmitted image signal is edited by a broadcast station, since it is edited in a unit of second, the image information of a frame is preferably independent from the image information of other frame. Accordingly, Long GOP (Group of Picture), which has a large number of frames that constitute GOP as a group of frames having correlated information, and Short GOP, which has a small number of frames that constitute GOP and is transmitted at a high bit rate (18 to 50 Mbps) must be transformed alternately so that image quality is not deteriorated even if image information is transmitted at a low bit rate (for example, 3 to 9 Mbps).

A system will be explained using FIG. 1 which can edit frames by, for example, recoding a Long GOP stream data transmitted and received through a transmission path to All Intra Frame stream data as Short GOP.

Long GOP stream data suitable for transmission is transmitted through a transmission path 1.

After a transcoder 2 decodes an MPEG GOP stream data of supplied through the transmission path 1 once by a decoder 21, it codes the stream data by a coder 22 so that it is entirely made to All Intra Frame and outputs coded All Intra stream data (SDTI CP (Serial Data Transport Interface Contents Package)) to a frame editor 3 of an SDTI CP interface.

The stream data edited by the frame editor 3 is supplied to a transcoder 4. After the transcoder 4 decodes the All Intra stream data supplied thereto by a decoder 23 once, it codes the stream data by a coder 24 so that it is made to an MPEG Long GOP stream data and outputs it to a predetermined data transmission destination through the transmission path 1.

When image information is repeatedly coded and decoded as described above, if an coding parameter changes each time it is used in coding, the image information is deteriorated. To prevent the deterioration of the image information, Japanese Unexamined Patent Application Publication No. 2000-059788 discloses a technology that can suppress deterioration of an image deteriorated by recoding by the use of coding history information inserted into a user data area of a picture layer of a bit stream.

There will be explained, for example, a case in which the coding history information is used in a system which can transform MPEG Long GOP into Short GOP that can be subjected to frame edition with reference to FIGS. 2 and 3. Note that, in FIGS. 2 and 3, the portions that correspond to those in FIG. 1 are denoted by the same reference numerals, and the explanation thereof is appropriately omitted.

First, the case in which the history information is used will be explained with reference to FIG. 2.

That is, a transcoder 31 is supplied with MPEG Long GOP through a transmission path 1.

Since the MPEG Long GOP is composed of three types of pictures each having a different coding feature (I-picture, P-picture, and B-picture), video data obtained by decoding the MPEG Long GOP is composed of video data having the features of the I-picture, P-picture, and B-picture depending on a frame. Accordingly, when the video data is recoded by MPEG Long GOP, image deterioration may occur when the video data having the features of the I-picture, the P-picture, or the B-picture is coded by a different picture type. When, for example, video data arranged as the B-picture before it was decoded, which was more liable to be deformed than the I-picture and the P-picture, is coded as the I-picture, the pictures in the vicinity of the video data is coded by prediction using the I-picture having much deformation as a reference image.

When, for example, the transcoder 31 receives stream data, which was coded by other transcoder in the past, through the transmission path 1, the transcoder 31 decodes the MPEG Long GOP stream data supplied thereto by a decoder 41 once and then codes it by a decoder 42 so that it is made to All Intra Frame. At the time, to prevent image deterioration due to the recoding, the parameters used in the coding executed in the past, that is, the parameters such as a coding picture type, a quantized value, and the like of the coded stream supplied to the decoder 41 are added to the All Intra coded stream as SMPTE (Society of Motion Picture and Television Engineers) 328M History data and supplied to a frame editor 3.

The stream data edited by the frame editor 3 is supplied to a transcoder 32 again. The transcoder 32 decodes the All Intra stream data with History data supplied thereto by a decoder 43. A decoder 44 recodes the decoded stream data to Long GOP using necessary parameters such as the picture type, the quantized value, and the like included in decoded History data and outputs it to the transmission path 1.

Next, a case in which parameter information is used will be explained with reference to FIG. 3.

A transcoder 51 is supplied with MPEG Long GOP through a transmission path 1.

A decoder 61, which is supplied with MPEG Long GOP stream data, acquires coding parameters necessary when the data is decoded, and supplies decoded video data and the obtained coding parameters to a coder 62. The coder 62 transforms the video data into an All Intra coded stream using the coding parameters supplied thereto and supplies the coded stream to a frame editor 3.

The stream data that is edited to a frame by the frame editor 3 is supplied to the transcoder 52 again. A transcoder 52 decodes the stream data supplied thereto by a decoder 63. When decoding is executed, the decoder 63 acquires necessary coding parameters and supplies decoded video data and the obtained coding parameters to a coder 64. The coder 64 transforms the video data into a Long GOP coded stream using the coding parameters supplied thereto and outputs it to the transmission path 1.

It is possible to prevent image deterioration by executing coding by reusing past coding information (the parameters of a picture layer and a macro block layer such as picture types of coding executed in the past, movement vector, quantized values, and the like) using History data or the coding parameters as described above. However, a stream whose bit rate, image frame, chroma format, and the like are different from those of a previous stream may be used in place of previous stream or may be inserted into the previous stream by, for example, edition and the like. In this case, all the image data cannot be coded by reusing information as to previous coding using history or parameter information.

DISCLOSURE OF THE INVENTION

The present invention, which was made in view of the above circumstances, makes it possible to determine whether or not information as to past coding can be reused depending on a status of image data to be coded.

An image processing apparatus of the present invention comprises acquisition means for acquiring information as to coding executed to the image data in the past and control means for controlling the coding processing up to a midstep or the perfect coding processing of the image data of the base band or the image data coded up to the midstep, wherein, when a coding picture type is a predetermined picture type, the control means determines whether or not the information as to coding is to be used to the coding processing based on the information as to the coding acquired by the acquisition means and on a condition as to the coding processing.

The control means may be caused to determine whether or not the information as to coding is to be used based on whether or not the phase of a macro block in the past coding described in the information as to coding agrees with the phase of the macro block of the coding processing.

The control means may be caused to determine whether or not the information as to coding is to be used based on whether or not the amount of generated code in the decoding described in the information as to coding is equal to or less than a predetermined value.

The image processing apparatus may be further provided with output means which is supplied with first coding data supplied to another image processing apparatus that decodes the image data and with second coding data created by the coding processing and outputs the first coding data or the second coding data, wherein the control means may further control the output means and cause the output means to output the first coding data when the phase of the macro block in the past coding described in the information as to coding agrees with the phase of the macro block of the coding processing, the amount of the generated code in the decoding described in the information as to coding is equal to or less than the predetermined value, and the position and the magnitude of an image frame in the past coding described in the information as to coding agree with those of the coding processing.

An image processing method of the present invention comprises acquiring information as to coding executed to the image data in the past, and determining, when a coding picture type is a predetermined picture type, whether or not the information as to coding is to be used to the coding processing based on the information as to the coding acquired by the acquisition means and on a condition as to the coding processing executed to the image data by the image processing apparatus.

A program recorded on a first recording medium of the present invention causes a computer to execute processing that comprises a first determination step for determining whether or not a coding picture type is a predetermined picture type, a comparison step for comparing, when it is determined by the processing at the first determination step that the picture type is the predetermined picture type, acquired information as to the coding with a condition as to the coding processing, and a second determination step for determining whether or not the information as to the coding is to be used to the coding processing based on a result of comparison of the processing executed at the comparison step.

A first program of the present invention causes a computer to execute processing that comprises a first determination step for determining whether or not a coding picture type is a predetermined picture type, a comparison step for comparing, when it is determined by the processing at the first determination step that the picture type is the predetermined picture type, acquired information as to the coding with a condition as to the coding processing, and a second determination step for determining whether or not the information as to the coding is to be used to the coding processing based on a result of comparison of the processing executed at the comparison step.

It is determined whether or not the coding picture type is the predetermined picture type. When it is determined that the coding picture type is the predetermined picture type, the acquired information as to the coding is compared with the condition as to the coding processing, and it is determined whether or not the information as to the coding is used to coding processing based on a result of comparison.

An information processing apparatus of the present invention comprises decoding means for decoding the image data, which is supplied thereto, perfectly or imperfectly and coding means for subjecting the image data of a base band, which is perfectly decoded by the decoding means, or the image data, which is created by being imperfectly decoded by the decoding means and coded up to a midstep, to coding processing up to a midstep or to perfect coding processing, wherein the coding means comprises acquisition means for acquiring information as to coding executed to the image data in the past, and control means for controlling the coding processing of the image data of the base band or the image data coded up to the midstep, and the control means determines, when a coding picture type is a predetermined picture type, whether or not the information as to coding is to be used to the coding processing based on the information as to the coding acquired by the acquisition means and on a condition as to the coding processing.

An information processing method of the present invention comprises a decoding step for decoding the image data, which is supplied thereto, perfectly or imperfectly, and a coding step for subjecting the image data of a base band, which is perfectly decoded by processing of the decoding step, or the image data, which is created by being imperfectly decoded by processing of the decoding step and coded up to a midstep, to coding processing up to a midstep or to perfect coding processing, wherein the processing at the coding step comprises a first determination step for determining whether or not a coding picture type is a predetermined picture type, a comparison step for comparing, when it is determined by the processing at the first determination step that the picture type is the predetermined picture type, acquired information as to the coding with a condition as to the coding processing, and a second determination step for determining whether or not the information as to the coding is to be used to the coding processing based on a result of comparison of the processing executed at the comparison step.

A program recorded on a second recording medium of the present invention causes a computer to execute processing that comprises a decoding step for decoding the image data, which is supplied thereto, perfectly or imperfectly, and a coding step for subjecting the image data of a base band, which is perfectly decoded by processing of the decoding step, or the image data, which is created by being imperfectly decoded by processing of the decoding step and coded up to a midstep, to coding processing up to a midstep or to perfect coding processing, wherein the processing at the coding step comprises a first determination step for determining whether or not a coding picture type is a predetermined picture type, a comparison step for comparing, when it is determined by the processing at the first determination step that the picture type is the predetermined picture type, acquired information as to the coding with a condition as to the coding processing, and a second determination step for determining whether or not the information as to the coding is to be used to the coding processing based on a result of comparison of the processing executed at the comparison step.

A second program of the present invention causes a computer to execute processing that comprises a decoding step for decoding the image data, which is supplied thereto, perfectly or imperfectly and a coding step for subjecting the image data of a base band, which is perfectly decoded by processing of the decoding step, or the image data, which is created by being imperfectly decoded by processing of the decoding step and coded up to a midstep, to coding processing up to a midstep or to perfect coding processing, wherein the processing at the coding step comprises a first determination step for determining whether or not a coding picture type is a predetermined picture type, a comparison step for comparing, when it is determined by the processing at the first determination step that the picture type is the predetermined picture type, acquired information as to the coding with a condition as to the coding processing, and a second determination step for determining whether or not the information as to the coding is to be used to the coding processing based on a result of comparison of the processing executed at the comparison step.

When the supplied image data is perfectly or imperfectly decoded, the image data of the base band, which is perfectly decoded, or the image data, which is created by being imperfectly decoded by the decoding means and coded to the midstep, is subjected to the coding processing up to the midstep or to the perfect coding processing, the information as to the coding executed to the image data in the past is acquired in the coding processing, and the coding picture type is the predetermined picture type, it is determined whether or not the information as to the coding is to be used to the coding processing based on the acquired information as to the coding and the condition as the coding processing, thereby processing, which subjects the image data of the base band or the image data coded up to the midstep to the coding processing up to the midstep or to the perfect coding processing, is controlled.

An information recording apparatus of the present invention comprises decoding means for decoding the image data, which is supplied thereto, perfectly or imperfectly, coding means for subjecting the image data of a base band, which is perfectly decoded by the decoding means, or the image data, which is created by being imperfectly decoded by the decoding means and coded up to a midstep, to coding processing up to a midstep or to perfect coding processing, and recording control means for controlling the record of the image data coded by the coding means, wherein the coding means comprises acquisition means for acquiring information as to coding executed to the image data in the past, and control means for controlling the coding processing of the image data of the base band or the image data coded up to the midstep, and wherein, when a coding picture type is a predetermined picture type, the control means determines whether or not the information as to coding is to be used to the coding processing based on the information as to the coding acquired by the acquisition means and on a condition as to the coding processing.

The recording control means may be caused to control recording of the image data coded by the coding means and information as to coding executed to the image data at different positions.

An information recording method of the present invention comprises a decoding step for decoding the image data, which is supplied thereto, perfectly or imperfectly, a coding step for subjecting the image data of a base band, which is perfectly decoded by processing of the decoding step, or the image data, which is created by being imperfectly decoded by processing of the decoding step and coded up to a midstep, to coding processing up to a midstep or to perfect coding processing, and a recording control step for controlling the recording of the image data coded by the processing at the coding step, wherein the processing at the coding step comprises a first determination step for determining whether or not a coding picture type is a predetermined picture type, a comparison step for comparing, when it is determined by the processing at the first determination step that the picture type is the predetermined picture type, acquired information as to the coding with a condition as to the coding processing, and a second determination step for determining whether or not the information as to the coding is to be used to the coding processing based on a result of comparison of the processing executed at the comparison step.

An information reproducing apparatus of the present invention comprises reproduction means for reproducing the image data recorded to a predetermined recording medium, decoding means for decoding the image data reproduced by the reproduction means perfectly or imperfectly, and coding means for subjecting the image data of a base band, which is perfectly decoded by the decoding means, or the image data, which is created by being imperfectly decoded by the decoding means and coded up to a midstep, to coding processing up to a midstep or to perfect coding processing, wherein the coding means comprises acquisition means for acquiring information as to coding executed to the image data in the past and control means for controlling the coding processing of the image data of the base band or the image data coded up to the midstep, and wherein the control means determines, when a coding picture type is a predetermined picture type, whether or not the information as to coding is to be used to the coding processing based on the information as to the coding acquired by the acquisition means and on a condition as to the coding processing.

An information reproducing method of the present invention comprises a reproduction step for reproducing the image data recorded to a predetermined recording medium, a decoding step for decoding the image data reproduced by the reproduction means perfectly or imperfectly, and a coding step for subjecting the image data of a base band, which is perfectly decoded by processing of the decoding step, or the image data, which is created by being imperfectly decoded by the decoding step and coded up to a midstep, to coding processing up to a midstep or to perfect coding processing, wherein the processing at the coding step comprises a first determination step for determining whether or not a coding picture type is a predetermined picture type, a comparison step for comparing, when it is determined by the processing at the first determination step that the picture type is the predetermined picture type, acquired information as to the coding with a condition as to the coding processing, and a second determination step for determining whether or not the information as to the coding is to be used to the coding processing based on a result of comparison of the processing executed at the comparison step.

The image data recorded on the predetermined recording medium is reproduced, the reproduced image data is perfectly or imperfectly decoded, the image data of the base band, which is perfectly decoded, or the image data, which is created by being imperfectly decoded and coded to the midstep, is subjected to the coding processing up to the midstep or to the perfect coding processing, the information as to the coding executed to the image data in the past is acquired in the coding processing, and the coding picture type is the predetermined picture type in the coding processing of the image data of the base band or the image data coded up to the midstep, it is determined whether or not the information as to the coding is to be used to the coding processing based on the acquired information as to the coding and the condition as the coding processing.

BRIEF DESCRIPTION OF DRAWINGS

FIG. 8 is a flowchart explaining coding control processing 1 executed by the coders of FIG. 7.

FIG. 17 is a block diagram showing an arrangement of a personal computer.

BEST MODE FOR CARRYING OUT THE INVENTION

Embodiments of the present invention will be described blow with reference to the drawings.

Figure 1:
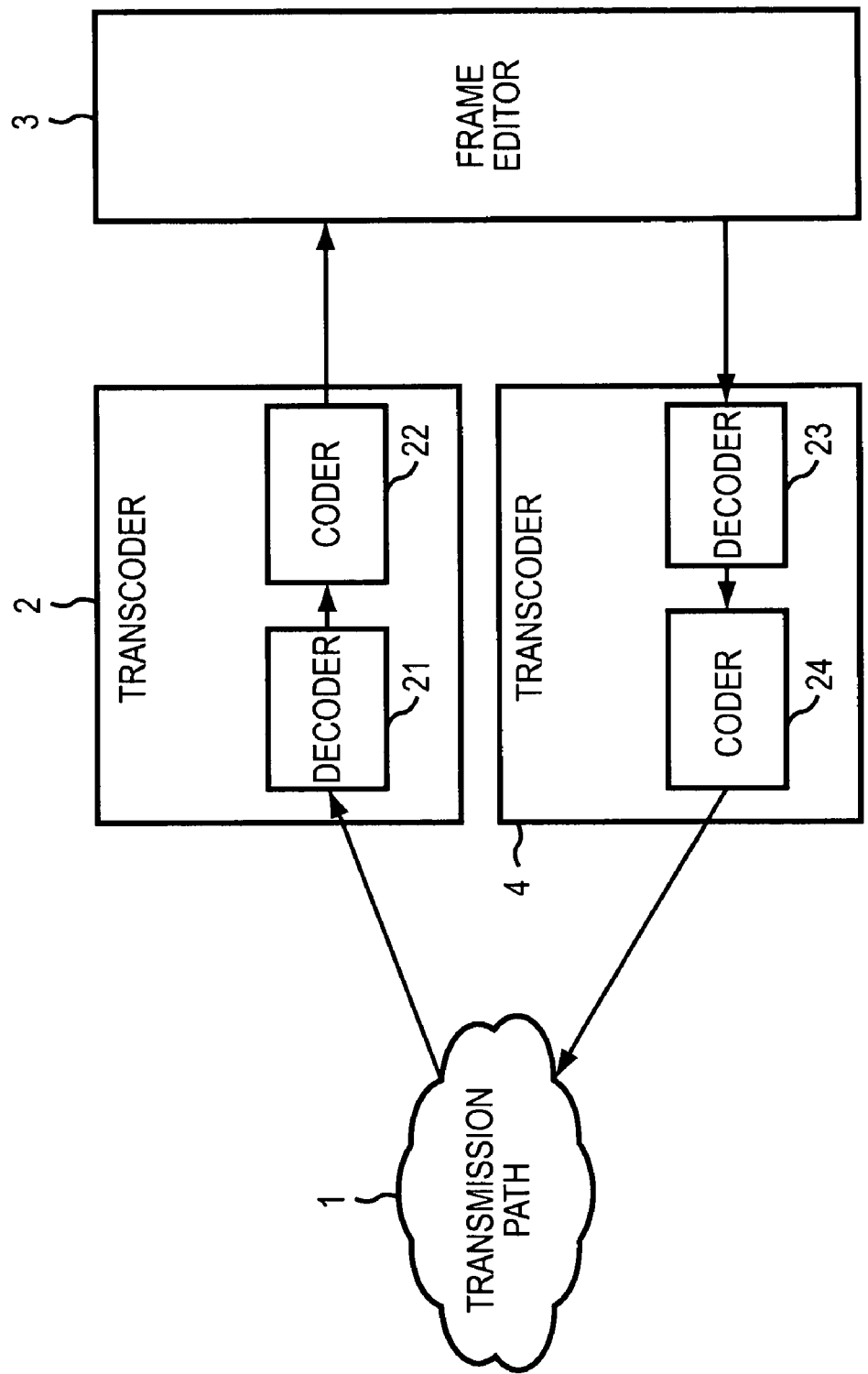
FIG. 1 is a view explaining a conventional system in which recoding is executed when a frame is edited.

FIG. 1 is a view showing an example of an arrangement of an embodiment of an information processing apparatus according to the present invention.

Figure 4:
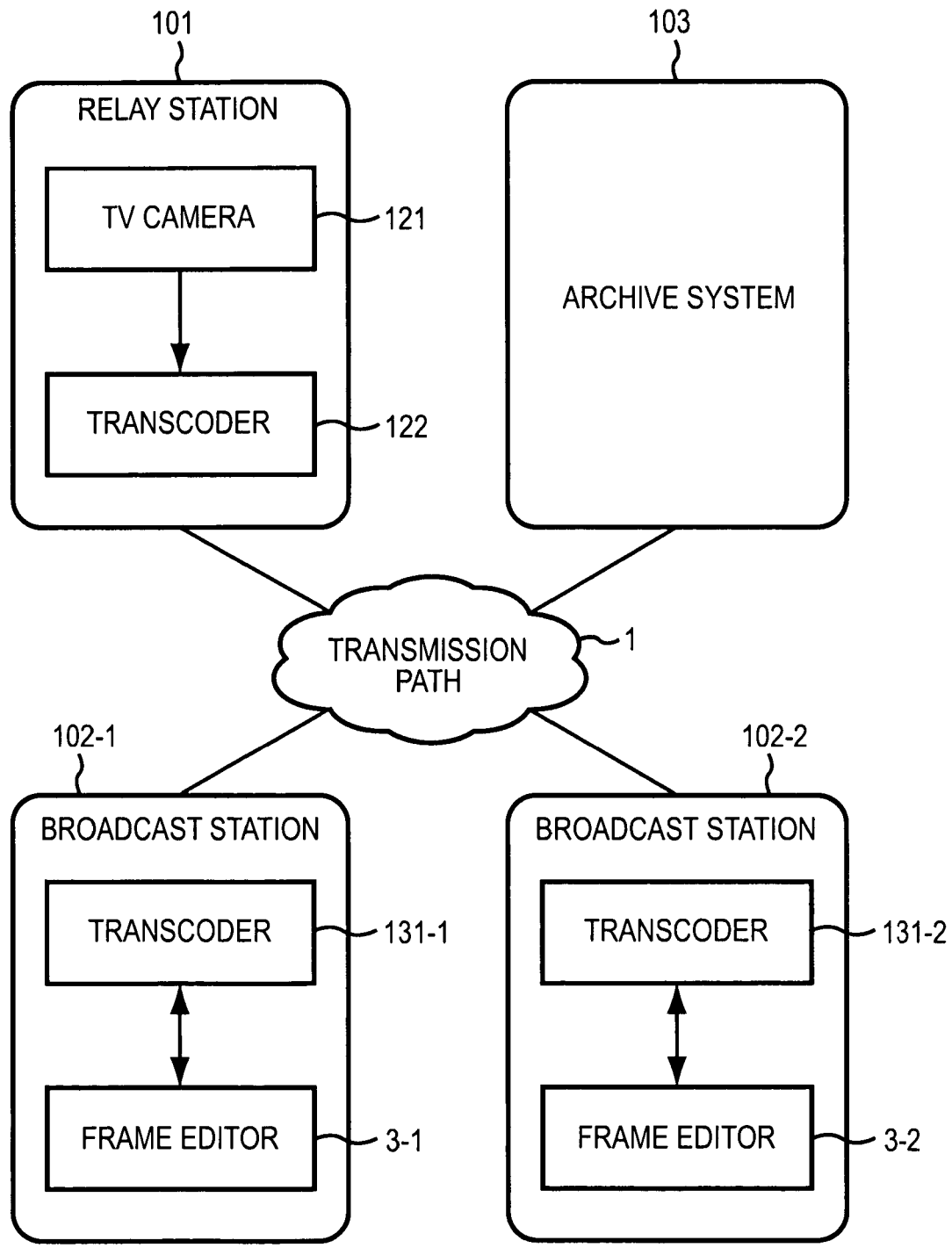
FIG. 4 is a view explaining a broadcasting data transmission/reception system to which the present invention is applied.

FIG. 4 shows a broadcasting data transmission/reception system to which the present invention is applied.

For example, image data recorded by a TV camera 121 in a relay station 101 is output to a transcoder 122 as SDTI CP (Serial Data Transport Interface Contents Package) signal coded by an MPEG All Intra compression system or as a signal of a non-compression SDI (Serial Digital Interface) system. SDTI CP is a global standard of a transmission system standardized as SMPTE326M by the promotion of Pro-MPEG Forum to transmit MPEG data in real time (synchronously). Further, DSI is a non-compressed digital video/audio transmission system based on point-to-point transmission and prescribed in ANSI (American National Standards Institute)/SMPTE (Society of Motion Picture and Television Engineers) 259M.

On receiving an All Intra SDTI CP (Serial Data Transport Interface Contents Package) signal or a non-compressed SDI signal, the transcoder 122 subjects the signal to Long GOP interframe compression having a good compression efficiency to save the band of a transmission path 1 and transmits the signal to a broadcast station 102-1, a broadcast station 102-2, or an archive system 103 through the transmission path 1.

A transcoder 131-1 of the broadcast station 102-1 is supplied with MPEG Long GOP stream data, transforms the stream data into stream data of an MPEG All Intra system which can be edited in a unit of frame, and outputs the transformed stream data to a frame editor 3-1. The frame editor 3-1 has an interface, for example, MXF (Material exchange Format), SDTI CP, and the like to which and from which a compressed stream can be directly input and output and edits the stream data of the MPEGA All Intra system supplied thereto by, for example, inserting a commercial message to the data or by processing an image, and outputs the edited data to the transcoder 131-1 so that it is broadcasted or saved in the archive system 103. The transcoder 131-1 transforms the thus supplied stream data of the MPEGA All Intra system into MPEG Long GOP stream data suitable for transmission through the transmission path 1 and transmits it to the archive system 103 through the transmission path 1.

MXF is a file format which is being standardized by Pro-MPEG Forum that takes a leading part. MXF is a format in which video data and audio data are multiplexed in a minute unit of each frame and the like in consideration of streaming, in addition to a file exchange.

A transcoder 131-2 of the broadcast station 102-2 is supplied with MPEG Long GOP stream data, transforms the stream data into stream data of the MPEG All Intra system which can be edited by the unit of frame, and outputs the stream data to a frame editor 3-2. The frame editor 3-2 has an interface, for example, MXF, SDTI CP, and the like to which and from which a compressed stream can be directly input and output and edits the stream data of the MPEG A All Intra system by, for example, inserting a commercial message to the data or by processing an image, and outputs the edited data to the transcoder 131-2 so that the edited data is broadcasted or saved in the archive system 103. The transcoder 131-2 transforms the thus supplied stream data of MPEG A All Intra system into MPEG Long GOP stream data suitable for transmission through the transmission path 1 and transmits it to the archive system 103 through the transmission path 1.

The archive system 103 saves the stream data supplied thereto so that it is used as a material of a program. Since the archive system 103 must effectively save data, it saves stream data of the MPEG Long GOP system having a high compression ratio.

In the following description, when the broadcast stations 102-1 and 102-2 need not be individually discriminated, they are simply called a broadcast station 102 collectively, when the transcoders 131-1 and 131-2 need not be individually discriminated, they are simply called a transcoder 131 collectively, and when the frame editors 3-1 and 3-2 need not be individually discriminated, they are simply called a frame editor 3, collectively.

Figure 5:
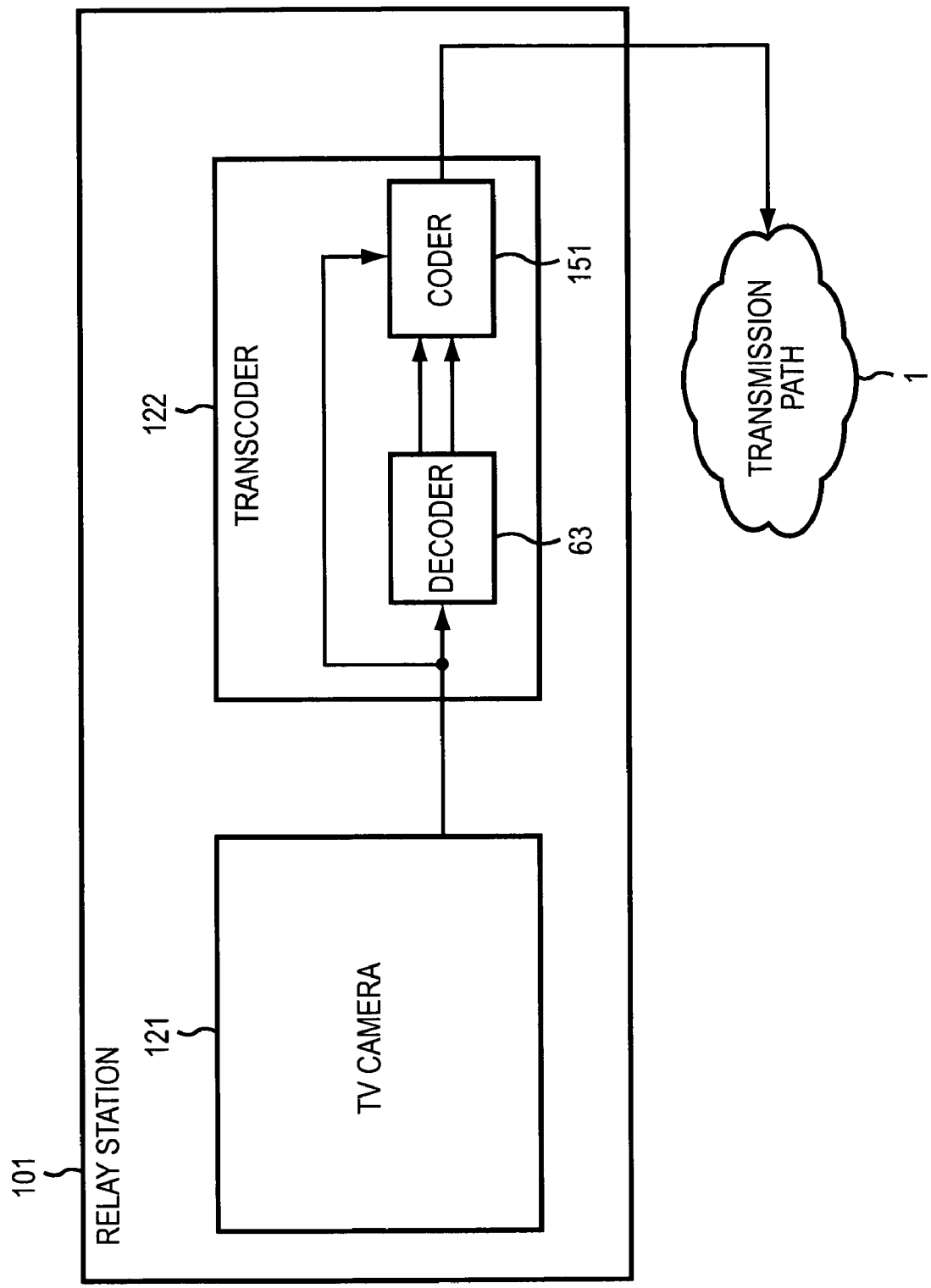
FIG. 5 is a block diagram showing an arrangement of a relay station of FIG. 4.

FIG. 5 is a block diagram showing an arrangement of the relay station 101 in more detail.

Figure 3:
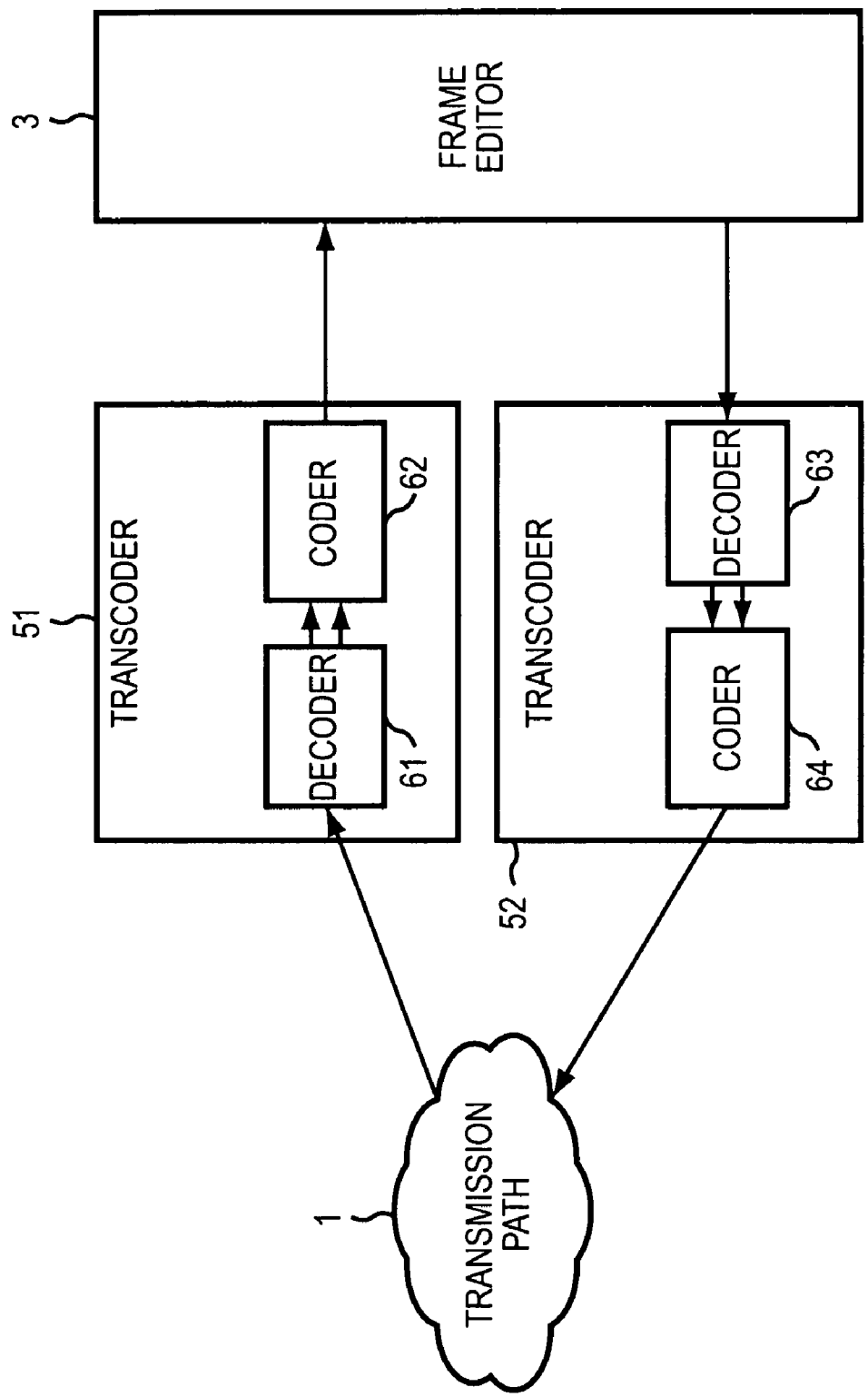
FIG. 3 is a view explaining a case in which coding history information (parameter information) is used in a conventional system in which the recoding is executed when a frame is edited.

Note that, the portions that correspond to those of the conventional case are denoted by the same reference numerals, and the explanation thereof is appropriately omitted. More specifically, the transcoder 122 includes an coder 151, which can select reusable history information in correspondence to the condition of a stream supplied thereto in place of the coder 64. The coder 151 is arranged fundamentally similar to the transcoder 52 of FIG. 3 except that the stream data input to a decoder 63 is also input thereto in addition to the decoded signal output from the decoder 63.

The image data recorded by the TV camera 121 in the relay station 101 is output to the transcoder 122 as an SDTI CP signal coded by the MPEG All Intra compression system.

The decoder 63 of the transcoder 122 is supplied with an All Intra SDTI CP signal, decodes it, acquires coding parameters necessary when the signal is decoded, and supplies the decoded video data and the acquired coding parameters to the coder 151. The coder 151 codes the video data so that it is made to MPEG Long GOP using as necessary the coding parameters supplied thereto and transmits the coded video data to a transmission path 1.

Figure 6:
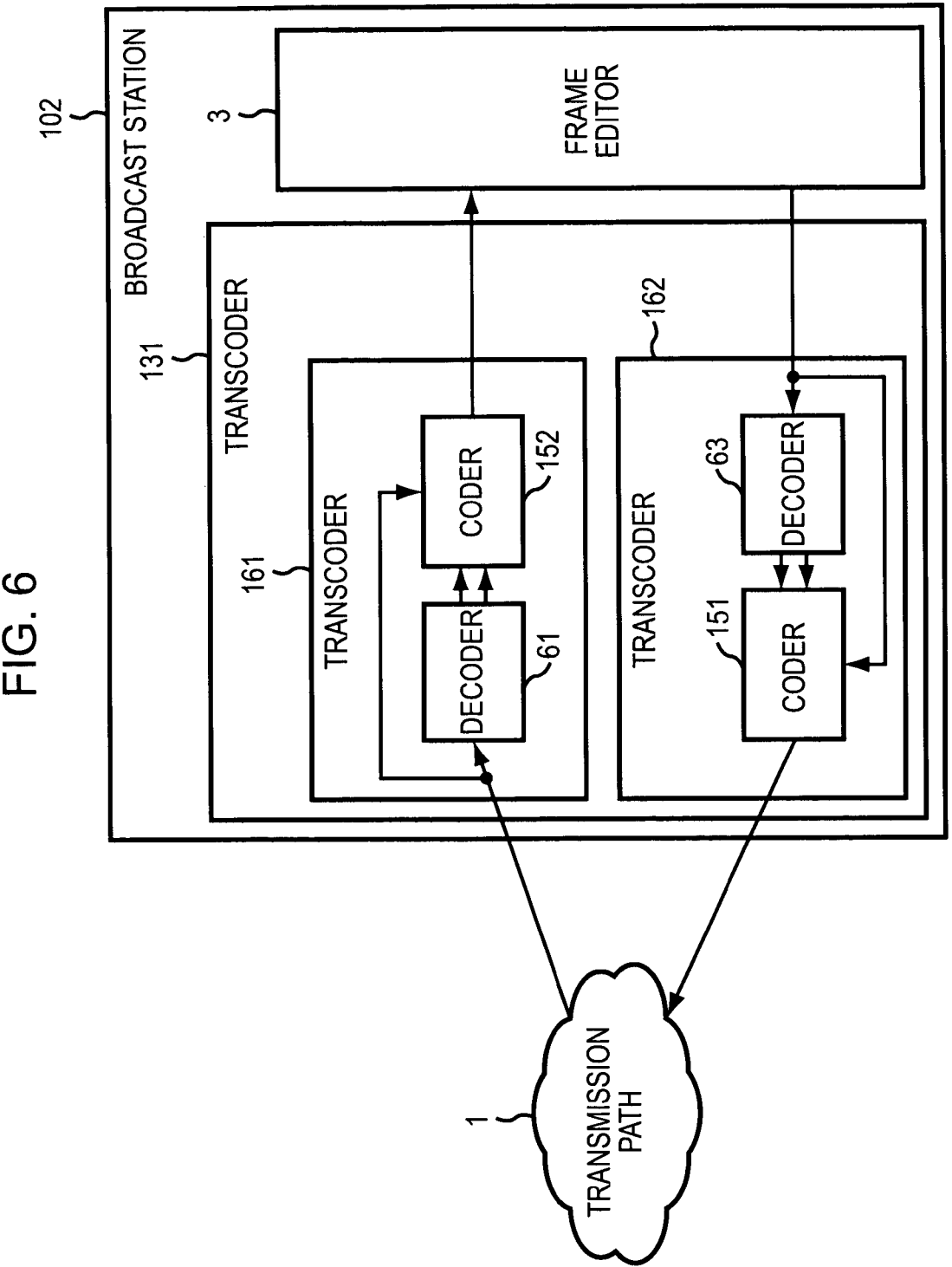
FIG. 6 is a block diagram showing an arrangement of a broadcast station of FIG. 4.

FIG. 6 is a block diagram showing an arrangement of the broadcast station 102 in more detail.

Note that, the portions that correspond to those of the conventional case are denoted by the same reference numerals, and the explanation thereof is appropriately omitted.

The transcoder 131 is composed of a transcoder 161, which transforms Long GOP stream data into All Intra stream data, and a transcoder 162 for transforming the All Intra stream data into Long GOP stream data. The transcoder 161 includes a coder 152, which can select reusable history information in correspondence to the condition of a supplied stream in place of the coder 62. The coder 152 is arranged fundamentally similar to the transcoder 51 of FIG. 3 except that the stream data input to the decoder 61 is also input thereto in addition to the decoded signal output from the decoder 61.

Further, the transcoder 162 includes a coder 151, which can select reusable history information in correspondence to the condition of a supplied stream in place of the coder 64. The coder 151 is arranged fundamentally similar to the transcoder 52 of FIG. 3 except that the stream data input to the decoder 63 is also input thereto in addition to the decoded signal output from the decoder 63.

The decoder 61 of the transcoder 161 is supplied with the MPEG Long GOP stream data and decodes it, acquires coding parameters necessary when it is decoded, and supplies the coded video data and the acquired coding parameters to the coder 152. The coder 152 codes the video data so that it is made to an All Intra SDTI CP signal using the coding parameter supplied thereto as necessary and supplies it to a frame editor 3.

The stream data edited to a frame by the frame editor 3 is supplied to a decoder 63 of the transcoder 162.

The decoder 63 of the transcoder 162 is supplied with the All Intra SDTI CP (Serial Data Transport Interface Contents Package) signal and decodes it, acquires coding parameters necessary when it is decoded, and supplies the decoded video data and the obtained coding parameters to the coder 151. The coder 151 codes the video data so that it is made to MPEG Long GOP using as necessary the coding parameters supplied thereto and transmits it to the transmission path 1.

Figure 7:
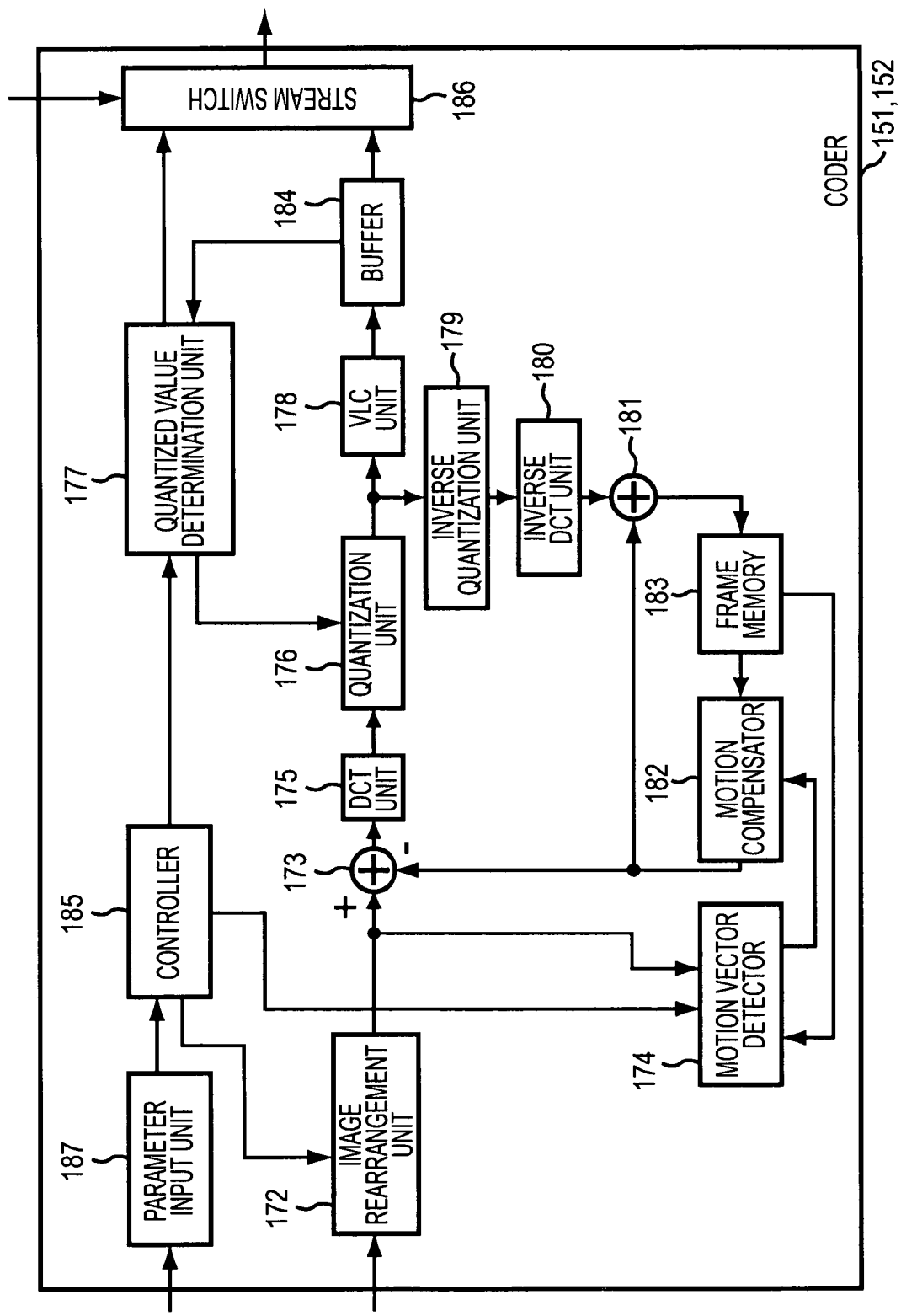
FIG. 7 is a block diagram showing an arrangement of coders of FIGS. 5 and 6.

FIG. 7 is a block diagram showing an arrangement of the coders 151 and 152.

A parameter input unit 187 acquires parameter information supplied from the decode 61 or 63 and supplies it to a controller 185.

The controller 185 is supplied with the parameter information from the parameter input unit 187 and partially or entirely controls the processings executed by an image rearrangement unit 172, a motion vector detector 174, a quantized value determination unit 177, and a stream switch 186 based on whether or not a condition of coding to be executed satisfies a predetermined condition with reference to the parameter information.

Specifically, the controller 185 determines whether the coded data, which is coded by the processings executed by the image rearrangement unit 172 to a buffer 184, is to be output or the stream data input to the decoder 61 or 62 is to be output based on whether or not a picture type of the coding to be executed is the I-picture, whether or not the phase of a macro block in previous coding agrees with the phase of a macro block in next coding, whether or not the amount of generated code of a unit of picture in decoding is within a predetermined range, and whether or not image frames are the same image frame. When the coded data, which is coded by the processings executed by the image rearrangement unit 172 to the buffer 184, is output, the controller 185 further determines whether or not parameters are reused and partly or entirely controls the processings executed by the image rearrangement unit 172, the motion vector detector 174, the quantized value determination unit 177, and the stream switch 186.

The image rearrangement unit 172 rearranges the respective frame images of image data input sequentially and creates macro block data divided into macro blocks composed of a 16 pixels×16 lines luminance signal of a color difference signal corresponding to the luminance signal under the control of the controller 185 and supplies them to an arithmetic operation unit 173 and the motion vector detector 174.

The motion vector detector 174 is input with the macro block data, calculates the motion vector of respective macro blocks based on the macro data block and the reference image data stored in a frame memory 183 under the control of the controller 185 and supplies them to a motion compensator 182 as motion vector data. Otherwise, the motion vector detector 174 supplies the motion vector of the previous coding supplied from the controller 185 to the motion compensator 182.

The arithmetic operation unit 173 compensates the motion of the macro block data supplied from the image rearrangement unit 172 based on the image types of the respective macro blocks. Specifically, the arithmetic operation unit 173 compensates the motion of the I-picture by an intra mode, compensates the motion of the P picture by a forward direction prediction mode, and compensates the motion of the B picture by a bi-direction prediction mode.

The intra mode is a method of using a frame image, which is an object to be coded, as transmission data as it is, the forward direction prediction mode is a method of using a prediction difference between the frame image, which is the object to be coded, and a past reference image as transmission data, and the binary image-direction prediction mode is a method of using a prediction difference between past and future reference images as transmission data.

First, when the macro block data is composed of the I-picture, it is processed by the intra mode. That is, the arithmetic operation unit 173 outputs the macro blocks of the macro block data input thereto to a DCT (Discrete Cosine Transform) unit 175 as it is as arithmetic operation data. The DCT unit 175 arranges the input arithmetic operation data as a DCT coefficient by subjecting it to DCT transformation processing and outputs the DCT coefficient to a quantization unit 176 as DCT coefficient data.

The quantization unit 176 subjects the DCT coefficient data input thereto to quantization processing based on a quantized value Q supplied from the quantized value determination unit 177 and outputs it to a VLC (Variable Length Code) unit 178 and an inverse quantization unit 179 as quantized DCT coefficient data. The quantization unit 176 controls an amount of code to be generated by adjusting a quantization step size in the quantization processing depending on the quantized value Q supplied from the quantized value determination unit 177.

The quantized DCT coefficient data supplied to the inverse quantization unit 179 is subjected to inverse quantization processing by the same quantization step size as the quantization unit 176 and supplied to an inverse DCT unit 180 as DCT coefficient data. The inverse DCT unit 180 subjects the CDT coefficient data supplied thereto to inverse DCT processing, and created arithmetic operation data is supplied to an arithmetic operation unit 181 and stored in a frame memory 183 as reference image data.

Then, when the micro block data is the P-picture, the arithmetic operation unit 173 subjects the micro block data to motion compensation processing by the forward direction prediction mode, whereas when the micro block data is the B-picture, the arithmetic operation unit 173 subjects the micro block data to motion compensation processing by the bi-direction prediction mode.

The motion compensator 182 compensates the motion of the reference image data stored in the frame memory 183 according to the motion vector data and calculates forward direction prediction image data or bi-direction prediction image data. The arithmetic operation unit 173 subjects the micro block data to subtraction processing using the forward direction prediction image data or the bi-direction prediction image data supplied from the motion compensator 182.

More specifically, in the forward direction prediction mode, the motion compensator 182 reads out the reference image data by shifting the address read out from the frame memory 183 according to the motion vector data and supplies the reference image data to the arithmetic operation units 173 and 181 as the forward direction prediction image data. The arithmetic operation unit 173 acquires difference data as a prediction difference by subtracting the forward direction prediction image data from the micro block data supplied thereto. Then, the arithmetic operation unit 173 supplies the difference data to the DCT unit 175.

The arithmetic operation unit 181 is supplied with the forward direction prediction image data from the motion compensator 182, partly reproduces the reference image data by adding the forward direction prediction image data to the arithmetic operation data supplied from the inverse DCT unit and outputs and stores it to and in the frame memory 183.

More specifically, in the bi-direction prediction mode, the motion compensator 182 reads out the reference image data by shifting the address read out from the frame memory 183 according to the motion vector data and supplies it to the arithmetic operation units 173 and 181 as the binary-direction prediction image data. The arithmetic operation unit 173 acquires difference data as a prediction difference by subtracting the bi-direction prediction image data from the micro block data supplied thereto. Then, the arithmetic operation unit 173 supplies the difference data to the DCT unit 175.

The arithmetic operation unit 181 is supplied with the bi-direction prediction image data from the motion compensator 182, partly reproduces the reference image data by adding the bi-direction prediction image data to the arithmetic operation data supplied from the inverse DCT unit and outputs and stores it to and in the frame memory 183.

With these operations, the image data input to the coder 151 or 152 is subjected to the motion compensation prediction processing, the DCT processing, and the quantization processing and is supplied to the VLC unit 178 as the quantized DCT coefficient data. The VLC unit 178 subjects the quantized DCT coefficient data to variable length coding processing based on a predetermined transformation table and supplies resulting variable length coded data to the buffer 184. After the buffer 184 buffers the variable length coded data supplied thereto, it outputs the data to the stream switch 186.

The quantized value determination unit 177 monitors the accumulated status of the variable length coded data stored in the buffer 184 at all times and determines the quantization step size based on occupied amount information showing the accumulated status or on the quantized value Q contained in the past coding parameter under the control of the controller 185.

When the quantized value determination unit 177 is supplied with the quantized value Q contained in the past coding parameter from the controller 185 and can reuse the quantized value of the past coding parameter, it can determine the quantization step size based on the quantized value Q contained in the past coding parameter.

Further, when the quantized value determination unit 177 does not determine the quantization step size based on the parameter information, it increases the quantization step size to reduce the amount of generated code when the amount of actually generated code of the macro blocks is larger than a target amount of generated code, whereas it reduces the quantization step size to increase the amount of generated code when the amount of actually generated code is smaller than the target amount of generated code.

More specifically, the quantized value determination unit 177 calculates the quantized value Q by determining the buffer occupying amount of a virtual buffer by assuming the transition of the accumulated status of the variable length coded data stored in a VBV (Video Buffer Verifier) disposed to the decoder and supplies the quantized value Q to the quantization unit 176.

The buffer occupying amount d(j) of a virtual buffer of a j-th macro block is shown by the following expression (1), the buffer occupying amount d(j+1) of a virtual buffer of a (j+1)-th macro block is shown by the following expression (2). The buffer occupying amount d(j+1) of the virtual buffer of the (j+1)-th macro block is shown by the following expression (3) by subtracting the expression (2) from the expression (1).

$$d(j)=d(0)+B(j-1)-\{T \times (j-1)/MBcnt\} \quad (1)$$

where d(0) shows an initial buffer capacity, B(j) shows the number of coding generated bits, MBcnt shows the number of macro blocks in a picture, and T shows a target amount of generated code in a unit of picture $$d(j+1)=d(0)+B(i)-(T \times j)/MBcnt\} \quad (2)$$

$$d(j+1)=d(j)+\{B(j)-B(j-1)\}-T/MBcnt \quad (3)$$

Accordingly, an amount of generated code controller 92 calculates the quantization index data Q(j+1) of the macro block (j+1) by substituting the buffer occupying amount d(j+1) and a constant r shown by an expression (4) into an expression (5) and supplies the quantization index data Q to a quantization unit 75.

$$r=(2 \times br)/pr \quad (4)$$

$$Q(j+1)=d(j+1) \times (31/r) \quad (5)$$

where br shows a bit rate, and pr shows a picture rate The quantization unit 176 determines the quantization step size in a next macro block based on the quantized value Q and quantizes the DCT coefficient data by the quantization step size.

With the above operation, the quantization unit 176 can quantize the DCT coefficient data by a quantization step size optimum to the target amount of generated code of a next picture calculated based on the amount of actually generated code in a previous picture.

Accordingly, the quantization unit 176 can create the DCT coefficient data quantized so that the buffer 184 does not overflow or underflow according to the amount of data occupying the buffer 184 as well as so that a VBV buffer of the decoder does not overflow or underflow.

When, for example, the transcoder 161 including the coder 152 transforms a Long GOP coded stream into an All Intra coded stream, the decoder 61 executes inverse quantization processing and an inverse DCT transformation, and the coder 152 executes DCT transformation and quantization processing. Since inverse DCT transformation and DCT transformation are orthogonal inverse transformation and orthogonal transformation, after the Long GOP coded stream is transformed, it is of the same picture type to the I-picture in it. Accordingly, when the phases of 8×8 DCT blocks inherent to MPEG agree with each other as well as the dct_types (fields or frames) thereof agree with each other, since the product of the orthogonal inverse transformation and the orthogonal transformation becomes 0 if an arithmetic operation is executed accurately, the image data of the I-picture is not deteriorated by executing orthogonal inverse transformation and orthogonal transformation.

Further, the inverse quantization processing is multiplication processing executed to the respective coefficients of the 8×8 DCT blocks, and the quantization processing is subtraction processing executed to the respective coefficients of the 8×8 DCT blocks. Accordingly, the quantization coefficients of the respective DCT coefficients agree with each other and quantizer_scales as the quantized values of the respective macro blocks agree with each other, the image data of the I-picture is not deteriorated by executing orthogonal inverse transformation and orthogonal transformation by reusing the value used to the multiplication in the inverse quantization processing to the subtraction in the quantization processing when an arithmetic operation error due to rounding and the like is sufficiently small.

That is, when the phases of the 8×8 DCT blocks inherent to MPEG agree with each other, the dct_types (fields or frames) thereof agree with each other, q_matrixes as the quantization coefficients of the respective DCT coefficients agree with each other, and quantizer_scales as the quantized values of the respective macro blocks agree with each other, no image is deteriorated in the I-picture input to the decoder 61 and in the I-picture output from the coder 152 by reusing the information of the picture type, the motion vector and the quantized value. Further, when the same image frame is used, the I-picture input to the decoder 61 can be output from the coder 152.

Likewise, when the transcoder 122 or 162 each including the coder 151 transforms the All Intra coded stream into the Long GOP coded stream, the decoder 63 executes inverse quantization processing and inverse DCT transformation, and the coder 151 executes DCT transformation and quantization processing. Since inverse DCT transformation and DCT transformation are orthogonal inverse transformation and orthogonal transformation, after the All Intra coded stream is transformed, it is of the same picture type with respect to a picture coded as the I-picture. Accordingly, when the phases of 8×8 DCT blocks inherent to MPEG agree with each other and the dct_types (fields or frames) thereof agree with each other, since the product of orthogonal inverse transformation and orthogonal transformation becomes 0 if an arithmetic operation is executed accurately, the image data of the I-picture is not deteriorated by executing orthogonal inverse transformation and orthogonal transformation.

Further, inverse quantization processing is multiplication processing executed to the respective coefficients of the 8×8 DCT blocks and quantization processing is subtraction processing executed to the respective coefficients of the 8×8 DCT blocks. Accordingly, when q_matrixes as the quantization coefficients of the DCT coefficients agree with each other and quantizer_scales as the quantized values of the respective macro blocks agree with each other, the image data of the I-picture is not deteriorated by the orthogonal inverse transformation and the orthogonal transformation by reusing the value used to multiplication in the inverse quantization processing to subtraction in the quantization processing when an arithmetic operation error due to rounding and the like is sufficiently small.

That is, when the phases of the 8×8 DCT blocks inherent to MPEG agree with each other, the dct_types (fields or frames) thereof agree with each other, q_matrixes as the quantization coefficients of the respective DCT coefficients agree with each other, and quantizer_scales as the quantized values of the respective macro blocks agree with each other, no image is deteriorated in the I-picture input to the decoder 63 and in the I-picture output from the coder 151 by reusing the information of the picture type, the motion vector and the quantized value. Further, when the same image frame is used, the I-picture input to the decoder 63 can be output from the coder 151.

In contrast, when a coding condition is not satisfied, an ordinary quantized value is determined in the coders 151 and 152 by the quantized value determination unit 177, thereby coding processing is executed without using a past coding parameter. When the quantized value determination unit 177 does not determine the quantization step size based on the parameter information, it increases the quantization step size to reduce the amount of generated code when the amount of actually generated code of the macro blocks is larger than a target amount of generated code, whereas it reduces the quantization step size to increase the quantization step size to increase the amount of generated code when the amount of actually generated code is smaller than the target amount of generated code. Accordingly, the quantized value determination unit 177 determines optimum quantization step sizes to the B picture and the P picture.

Next, coding control processing executed by the coders 151 and 152 will be explained with reference to a flowchart of FIG. 8.

At step S1, the controller 185 determines whether or not a coding picture type is the I-picture. When it is determined that the coding picture type is not the I-picture, processing goes to step S7 to be described later.

When it is determined at step S1 that the coding picture type is the I-picture, the controller 185 is supplied with parameter information from the parameter input unit 187 at step S2 and determines whether or not the phase of a macro block in previous coding agrees with the phase of a macro block of present coding referring to the information showing the phases of the macro blocks included in the parameter information (for example, information similar to v_phase and h_phase in SMPTE 329M). When it is determined at step S2 that the phase of the macro block in the previous coding does not agree with that of the present coding, the processing goes to step S7 to be described later.

When it is determined at step S2 that the phase of the macro block in the previous coding agrees with that of the present coding, the controller 185 determines at step S3 whether or not amount of generated code in a unit of picture in decoding≦target amount of code×α is satisfied when a constant α is set to $1 \leq \alpha < 2$ based on the data of a bit rate included in the parameter information supplied from the parameter input unit 187. When it is determined at step S3 that amount of generated code in a unit of picture in decoding≦target amount of code×α is not satisfied, the processing goes to step S7 to be described later.

In an image and the like in which a larger amount of motion vector is generated by Long GOP coding, there is a case in which image quality may be improved by allocating a larger amount of code to the P-picture and the B-picture. Further, when a Long GOP coding rate is small, the amount of code may be not controlled when q_scale in All Intra coding is reused. Therefore, the constant α is set to, for example, a value that does not make it difficult to control an amount of code and thus set to a weight coefficient of $1 \leq \alpha < 2$.

When it is determined at step S3 that amount of generated code in a unit of picture in decoding≦target amount of code×α is satisfied, the controller 185 determines whether or not an image frame in the previous coding is the same as that in the present coding at S4 referring to information showing image frames included in the parameter information supplied from the parameter input unit 187 (for example, information similar to horizontal_size_value and vertical_size_value in SMPTE 329M)

When it is determined at step S4 that the image frame in the previous coding is not the same as that of the present coding, the controller 185 reuses at step S5 the information of a picture type, motion vector, and a quantized value included in the parameter information supplied from the parameter input unit 187. More specifically, the controller 185 controls the prescribed portions of the coder 151 or 152 so that coding is executed reusing the parameter information (for example, intra_quantizer_matrix[64], chroma_intra_quantizer_matrix [64], q_scale_type, intra_dc_precision in SMPTE 329M and SMPTE 328M, and information corresponding to q_scale_type) supplied from the parameter input unit 187 and finishes the processing.

When it is determined at step S4 that the image frame in the previous coding is the same as that of the present coding, the controller 185 outputs the stream data input to the decoder 63 by controlling the stream switch 186 at step S6 and finishes the processing.

When it is determined at step S1 that the coding picture type is not the I-picture, when it is determined at step S2 that the phase of the macro block in the previous coding does not agree with that of the macro block of the present coding, or when it is determined at step S3 that amount of generated code in a unit of picture in decoding≦target amount of code×α is not satisfied, the controller 185 controls at step S7 the respective portions of the coder 151 or 152 so that coding is executed without reusing the parameters and finishes the processing.

With the above processing, the stream data input to the decoder is output as it is, or coding is executed using the parameter information only when the I-picture that satisfies the predetermined condition is coded. Accordingly, it can be prevented to allocate an excessive amount of generated code to the I-picture whose image quality cannot be more improved even if it is further allocated with it.

In the system explained using FIG. 4, when any of the parameters is predetermined, the termination of the condition as to the parameter may be omitted. When, for example, q_scale_type is used in the same value in all the coding in the system explained using FIG. 4, the determination of the condition as to q_scale_type may be omitted. Further, it is needless to say that the order for determining the conditions in the processing at steps S1 to S3 may be changed.

Figure 9A:
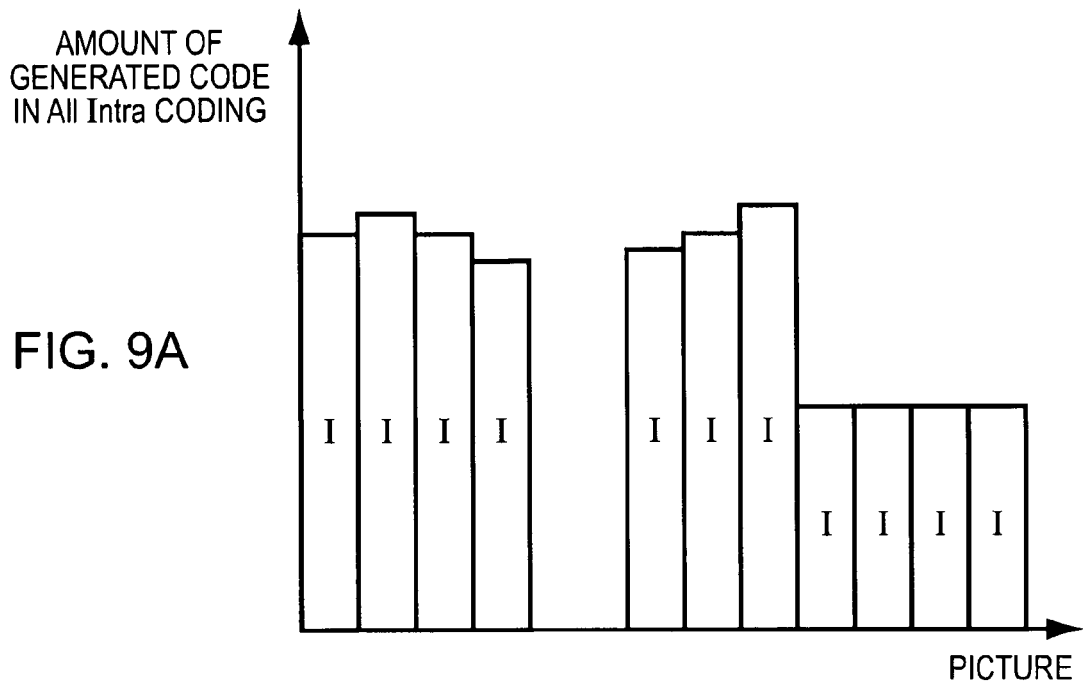
FIG. 9A is a view explaining how an amount of code is allocated.
Figure 9B:
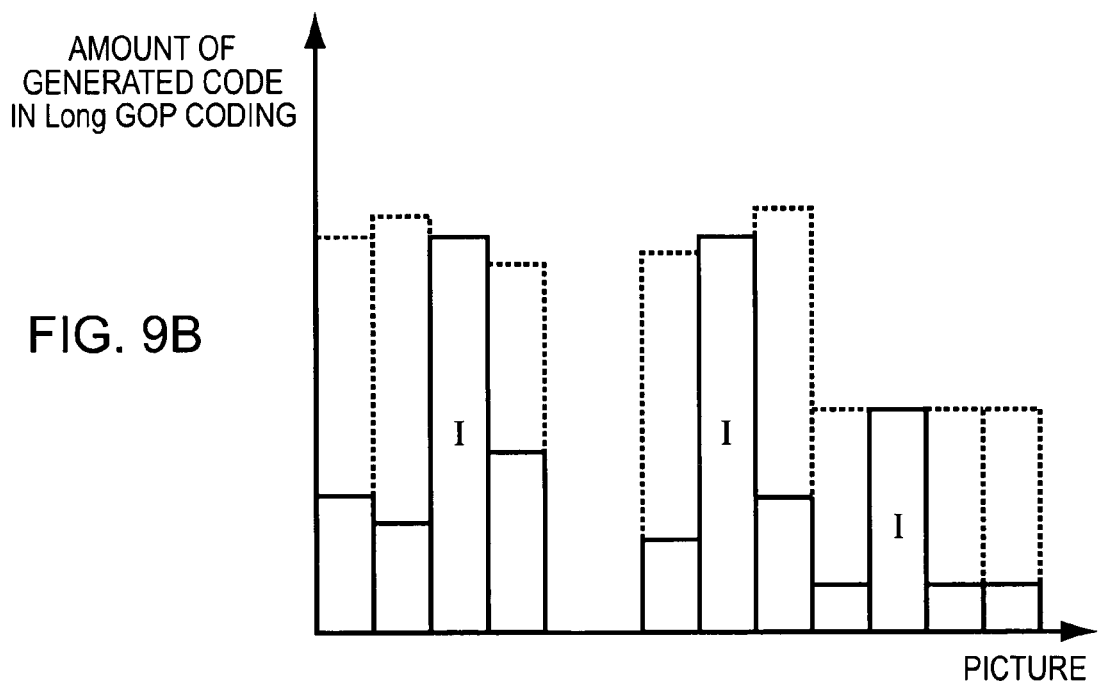
FIG. 9B is a view explaining how an amount of code is allocated.

It can be prevented to allocate the excessive amount of generated code to the I-picture whose image quality cannot be more improved even if it is further allocated with it by allocating the same amount of generated code in Long GOP and All Intra by reusing the information of the picture type, the motion vector, and the quantized value as shown in FIGS. 9A and 9B. Therefore, since an optimum amount of code can be allocated, a sufficient amount of code can be allocated to the B-picture and the P-picture accordingly.

Figure 2:
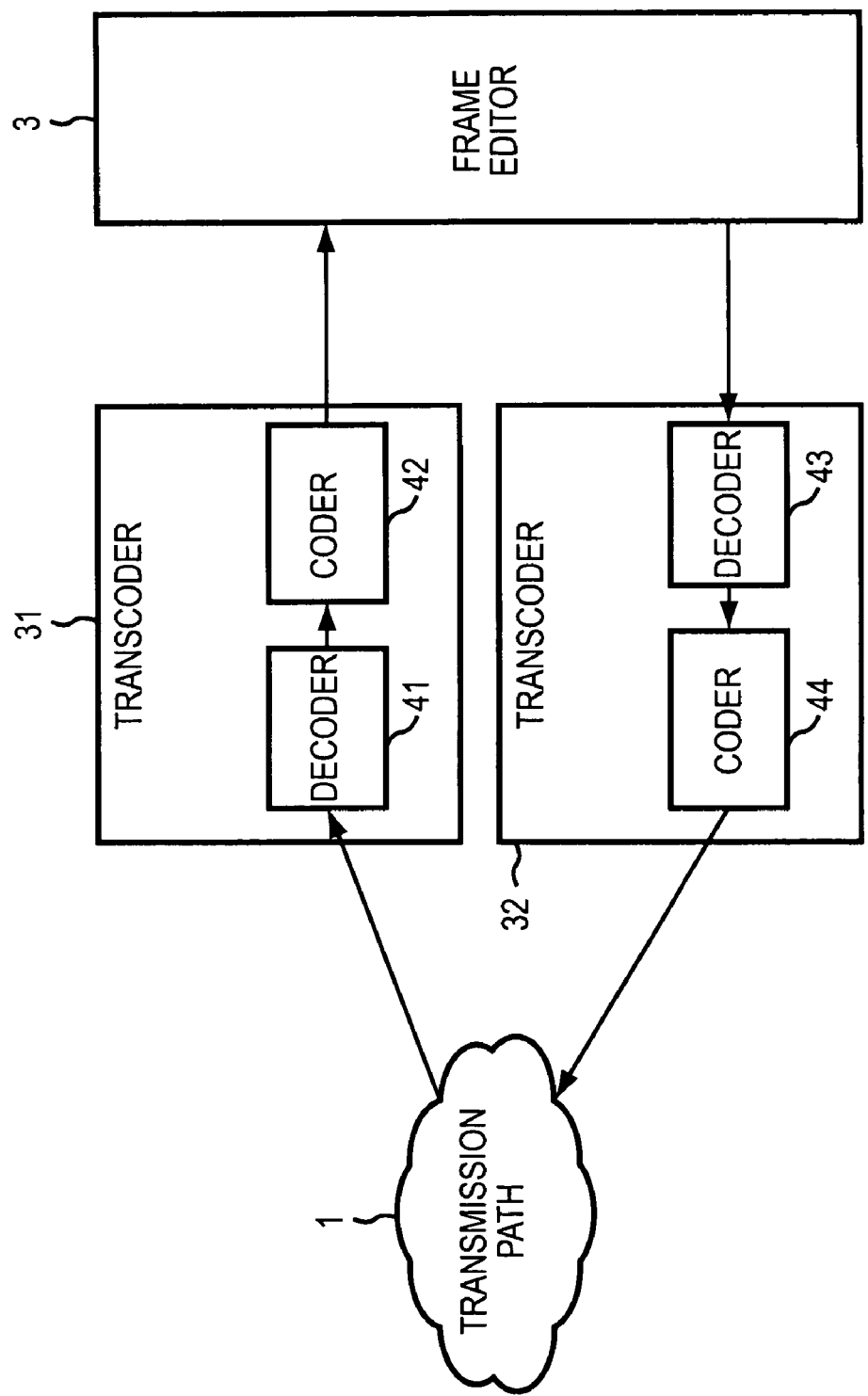
FIG. 2 is a view explaining a case in which coding history information (history information) is used in a conventional system in which recoding is executed when a frame is edited.

Note that, the above explanation is made assuming that the present invention is applied to the coder 151 of the transcoder 122 of the relay station 101 of FIG. 4 and the coder 151 of the transcoder 162 constituting the transcoder 131 and the coder 152 of the transcoder 161 of the broadcast station 102. However, the transcoders 31 and 32 for executing coding making use of the conventional history information explained using FIG. 2 may be used in place of the transcoders 162 and 161 constituting the transcoder 131 of the broadcast station 102. More specifically, deterioration of image data due to decoding and coding executed repeatedly can be prevented so that codes can be allocated optimally in coding by applying the present invention only in the transcoder 122 of the relay station 101 of FIG. 4, executing coding by reusing the parameter information (intra_quantizer_matrix[64], chroma_intra_quantizer_matrix[64], q_scale_type, intra_dc_precision in SMPTE 329M and SMPTE 328M and information to q_scale_type) only when the predetermined condition described above is satisfied in the coding of the I-picture, and transmitting information as to the coding executed in the transcoder 122 as history information together with stream data in the coding executed thereafter.

Further, when the I-picture, which satisfies the predetermined condition, is coded, it is also possible to reuse the picture type and the motion vector and to determine the quantized value using a technology called a back search disclosed in, for example, Japanese Unexamined Patent Application Publication No. 10-174098 and the like. The back search is a technology for determining a quantization step showing a smallest minimum value as an optimum quantization step by making use of a property that when a quantization step used in previous compression coding or a quantization step, which is in a multiple relation to the previous compression coding, is used, the surplus total sum of a DCT coefficient is minimized.

Figure 10:
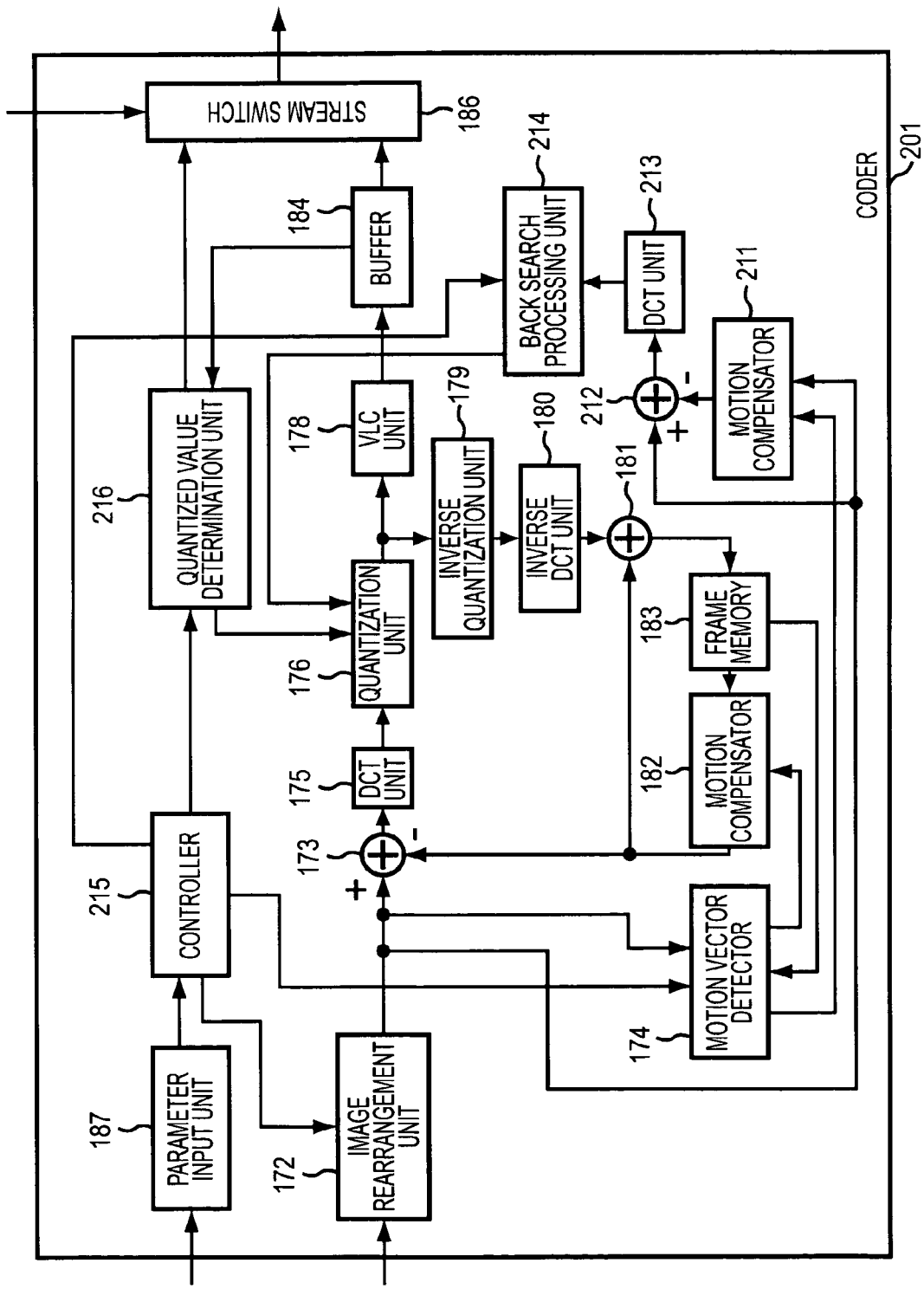
FIG. 10 is a block diagram showing an arrangement of a coder that can execute back search processing.
Figure 11:
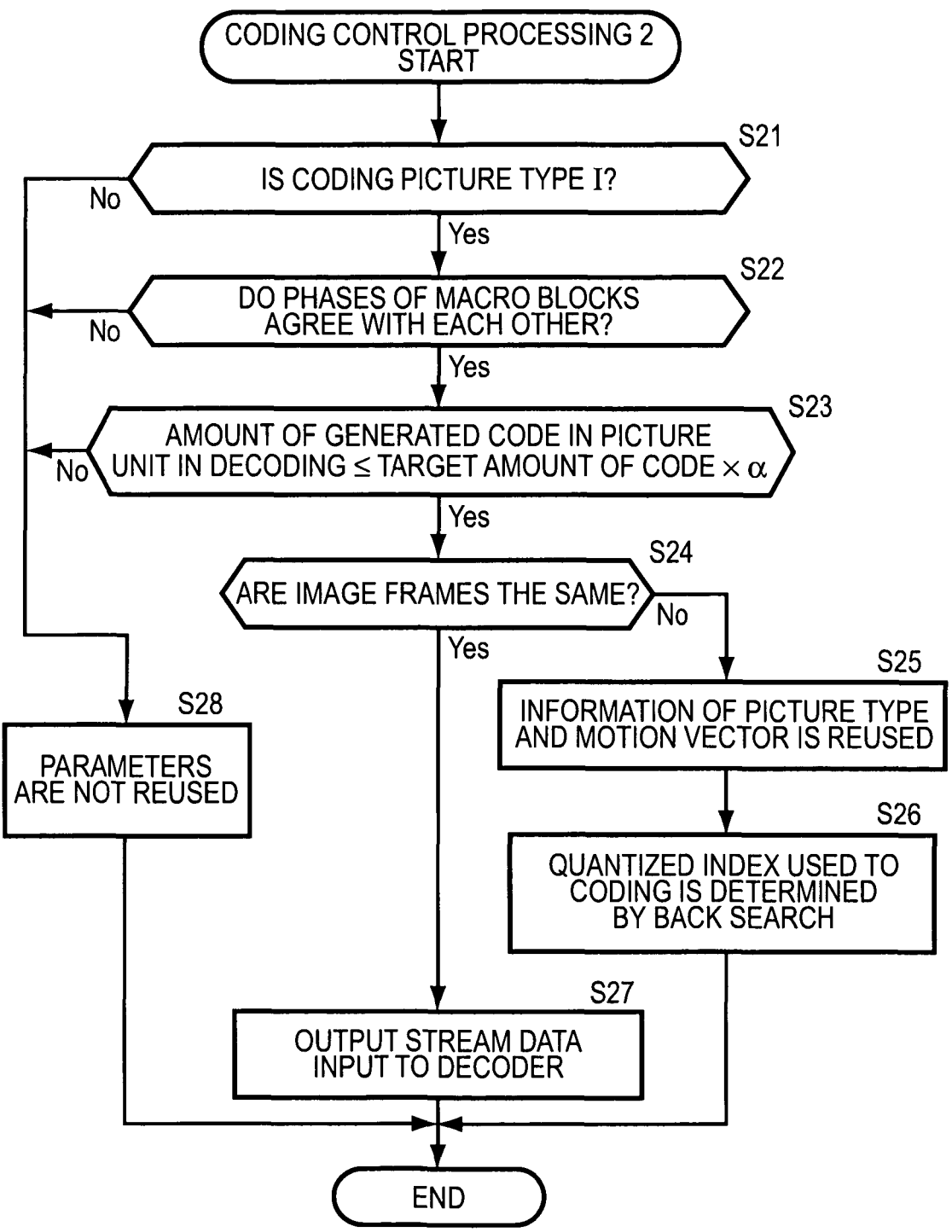
FIG. 11 is a flowchart explaining coding control processing 2 executed by the coder of FIG. 10.

To apply the back search technology to the present invention, a coder 201 shown in FIG. 10 is used in place of the coder 151 or 152 of FIGS. 5 and 6. Note that the portions of the coder 201 in FIG. 10, which correspond to those explained using FIG. 7, are denoted by the same reference numerals and the explanation thereof is appropriately omitted.

That is, the coder 201 of FIG. 10 has the same arrangement as the coder 151 or 152 explained using FIG. 7 except that a controller 215 is provided in place of the controller 185, a quantized value determination unit 216 is provided in place of the quantized value determination unit 177, and a motion compensator 211, an arithmetic operation unit 212, a DCT unit 213, and a back search processing unit 214 are newly provided.

The controller 215 determines whether or not the condition of coding to be executed satisfies the predetermined condition based on the parameter information supplied from the parameter input unit 187 and partly or entirely controls the image rearrangement unit 172, the DCT unit 175, the quantized value determination unit 216, and the stream switch 186 based on the above determination likewise the controller 185.

When the parameters are not reused under the control of the controller 215, the quantized value determination unit 216 determines the quantized value likewise the quantized value determination unit 177. However, when the I-picture, which satisfies the predetermined condition, is coded, the quantized value determination unit 216 does not determine the quantized value.

The motion compensator 211 subjects the micro block data, which is output from the image rearrangement unit 172, to motion compensation processing using the motion vector input from the motion vector detector 174 likewise the motion compensator 182 and outputs the compensated micro block data to the arithmetic operation unit 212. The arithmetic operation unit 212 subtracts predicted image data, which is input from the motion compensator 211 and the motion of which is compensated, from the micro block data output from the image rearrangement unit 172 when necessary, creates I-picture video data and the prediction error data of the P-picture or the B-picture, and outputs them to the DCT unit 213.

The DCT unit 213 subjects the I-picture video data input from the arithmetic operation unit 212 or the prediction error data of the P-picture or the B-picture to DCT transformation, creates a DCT coefficient obtained as result of the DCT processing, and supplies it to the back search processing unit 214.

When the back search processing unit 214 codes the I-picture satisfying the predetermined condition under the control of the back search processing unit 214, it creates quantized data by quantizing the DCT coefficient supplied from the DCT unit 213 and estimate a degree of difficulty of the image pattern of the input video data in every unit period based on the data amount (amount of generated code) of the created quantized data.

The difficulty of the image pattern corresponds to a degree of difficulty of coding, and a more difficult image pattern corresponds to a higher degree of difficulty of coding. The difficulty of the image pattern can be roughly calculated based on a statistics value such as Intra AC and the like.

Intra AC is a parameter defined as a total sum of the dispersed values of the video data of respective DCT blocks in a DCT processing unit in an MPEG system, indicates complexity of a video, and has a correlation between the difficulty of an image pattern of the video and an amount of data after it is compressed. That is, Intra AC is the total sum in a screen of the sum of absolute values obtained by subtracting the average value of the pixel values of the respective blocks from the pixel values of respective pixels in a DCT block unit.

The back search processing unit 214 allocates a large amount of data (data rate) to the portion in which input video data has a difficult image pattern and allocates a small amount of data (data rate) to the portion in which input video data has a simple image pattern according to a degree of difficulty of the estimated input video data to thereby keep high quality of output video data as a whole and moreover calculates a quantization index showing a quantization step to be actually used to prevent the total amount of the output video data from exceeding an allowable value in every unit period.

The back search processing unit 214 determines whether or not the input video data is subjected to compression coding at least once by a back search, creates a quantization index showing a quantization step used in previous compressing coding, and sets the quantization index to the quantization unit 176. That is, the back search processing unit 214 divides the DCT coefficient supplied from the DCT unit 213 by the value of the quantization step shown by the calculated quantization index and values near to the quantization step. When there exists a quantization step whose total sum of a surplus as a result of division shows an extremely small value, the back search processing unit 214 determines that the quantization step showing the extremely small value as a quantization step used in the previous compression coding and outputs the quantization index showing the quantization step to the quantization unit 176.

When the I-picture, which satisfies the predetermined condition, is coded, the quantization unit 176 quantizes the DCT coefficient data supplied from the DCT unit 175 using the quantization index supplied from the back search processing unit 214.

Next coding control processing 2 executed by the coder 201 will be explained with reference to a flowchart of FIG.

At step S21, the controller 215 determines whether or not a coding picture type is the I picture. When it is determined at step S21 that the coding picture type is not the I-picture, processing goes to step S28 to be described later.

When it is determined at step S21 that the coding picture type is the I-picture, the controller 215 is supplied with parameter information from the parameter input unit 187 at step S22 and determines whether or not the phase of a macro block in previous coding agrees with that of a macro block of present coding referring to the information showing the phase of the macro blocks included in the parameter information (for example, information similar to v_phase and h_phase in SMPTE 329M). When it is determined at step S22 that the phase of the macro block in the previous coding does not agree with that of the present coding, the processing goes to step S28 to be described later.

When it is determined at step S22 that the phase of the macro block in the previous coding agrees with that of present coding, the controller 215 determines at step S23 whether or not amount of generated code in a unit of picture in decoding≦target amount of code×α is satisfied when a constant α is set to 1≦α<22 based on the data of a bit rate included in the parameter information supplied from the parameter input unit 187. When it is determined at step S23 that amount of generated code in a picture unit in decoding≦target amount of code×α is not satisfied, the processing goes to step S28 to be described later.

In an image and the like in which a larger amount of motion vector is generated by Long GOP coding, there is a case in which image quality may be improved by allocating a larger amount of code to the P-picture and the B-picture. Further, when a Long GOP coding rate is small, the amount of code may be not controlled when q_scale in All Intra coding is reused. Therefore, the constant α is set to, for example, a value that does not make it difficult to control an amount of code and thus set to a weight coefficient of 1≦α<2.

When it is determined at step S23 that amount of generated code in a unit of picture in decoding≦target amount of code×α is satisfied, the controller 215 determines whether or not an image frame in the previous coding is the same as that in the present coding at S24 referring to information showing image frames included in the parameter information supplied from the parameter input unit 187 (for example, information similar to horizontal_size_value and vertical_size_value in SMPTE 329M).

When it is determined at step S24 that the image frame in the previous coding is not the same as that of the present coding, the controller 215 controls the respective portions of the coder 201 by reusing at step S25 the picture type and the motion vector included in the parameter information supplied from parameter input unit 187 so that coding can be executed.

At step S26, the controller 215 controls the back search processing unit 214 and causes the back search processing unit 214 to determine a quantizing index used in coding and to supply it to the quantization unit 176. The quantization unit 176 executes quantization based on the quantizing index supplied thereto and finishes the processing.

When it is determined at step S24 that the image frame in the previous coding is the same as that of the present coding, the controller 215 outputs the stream data input to the decoder 63 by controlling the stream switch 186 at step S27 and finishes the processing.

When it is determined at step S21 that the coding picture type is not the I-picture, when it is determined at step S22 that the phase of the macro block in the previous coding does not agree with that of the macro block of present coding, or when it is determined at step S23 that amount of generated code in a unit of picture in decoding≦target amount of code×α is not satisfied, the controller 215 controls at step S28 the respective portions of the coder 201 so that coding is executed without reusing the parameters and finishes the processing.

The above processing permits the stream data, which is input to the decoder, to be output as it is or coding to be executed using the back search processing and the parameter information only when the I-picture that satisfies the predetermined condition is coded. Accordingly, it can be prevented to allocate an excessive amount of generated code to the I-picture whose image quality cannot be more improved even if it is further allocated with the excessive amount of generated code.

Note that, the above embodiments are explained assuming that each of the transcoders for transforming the stream data has the decoder and the coder. However, the present invention can be also applied even to a case in which the decoder and the coder are composed of a decoding apparatus and a coding apparatus arranged as independent apparatuses.

Figure 12:
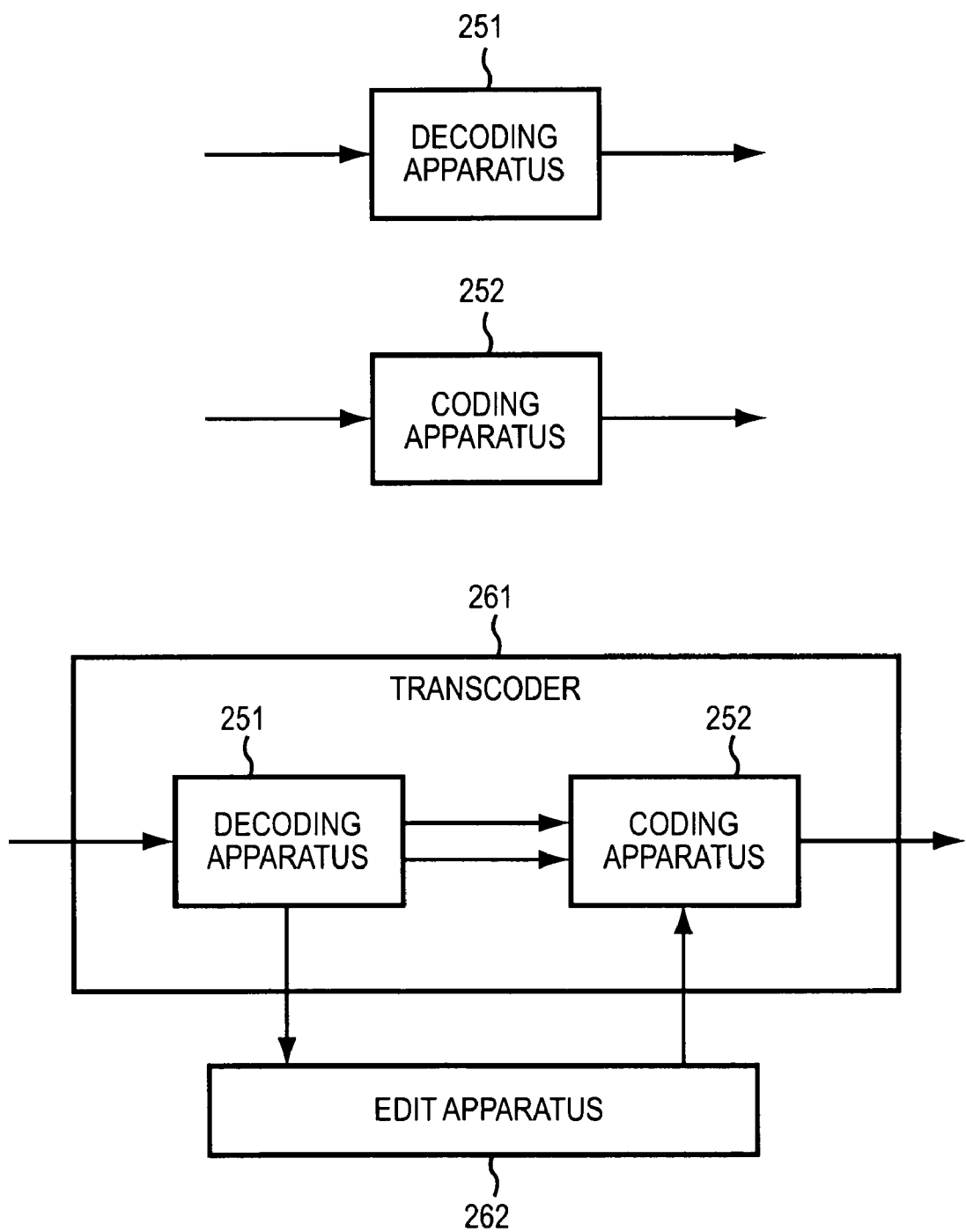
FIG. 12 is a view explaining an arrangement of a different apparatus to which the present invention can be applied.

More specifically, the above embodiments are explained assuming that the respective transcoders transform the stream data. However, as shown in, for example, FIG. 12, a decoding apparatus 251, which decodes a stream data and transforms it to a base band signal, and a coding apparatus 252, which codes a base band signal and transforms it in stream data, may be arranged as apparatuses independent of each other. Further, the present invention can be also applied to a case in which the decoding apparatus 251 does not completely decode stream data supplied thereto and the corresponding coding apparatus 252 partially codes the corresponding portion of the incompletely decoded data.

When, for example, the decoding apparatus 251 only decodes and inversely quantizes a VLC code and does not subject it to an inverse DCT transformation, although the coding apparatus 252 executes quantizing processing and variable length coding processing, it does not execute DCT transformation processing. It is needless to say that the present invention can be also applied to determine whether or not a quantized value obtained in the quantization executed by the coding apparatus 252 which executes the partial coding (coding from a midstep) as described above is to be reused.

Further, the present invention can be also applied to a case in which the coding apparatus 252 codes a base band signal, which is completely decoded by the decoding apparatus 251, up to a midstep (for example, although DCT transformation and quantization are executed, variable length coding processing is not executed), a case in which the coding apparatus 252 codes data, which is coded up to a midstep because the decoding apparatus 251 does not completely decode it (for example, although a VCL signal is only decoded and inversely quantized, it is not inversely DCT-transformed) further up to a midstep (for example, although quantization is executed, variable length coding processing is not executed), and the like.

Further, the present invention can be also applied to a transcoder 261 which is composed of the decoding apparatus 251 for executing the partial decoding and the coding apparatus 252 for executing the partial coding. The transcoder 261 is used when, for example, an edit apparatus 262 for editing such as splicing and the like is utilized.

Further, the transcoder to which the present invention is applied can be also applied to an information recording apparatus for recording information to a recording medium and to an information reproducing apparatus for reproducing information recorded to a recording medium.

Figure 13:
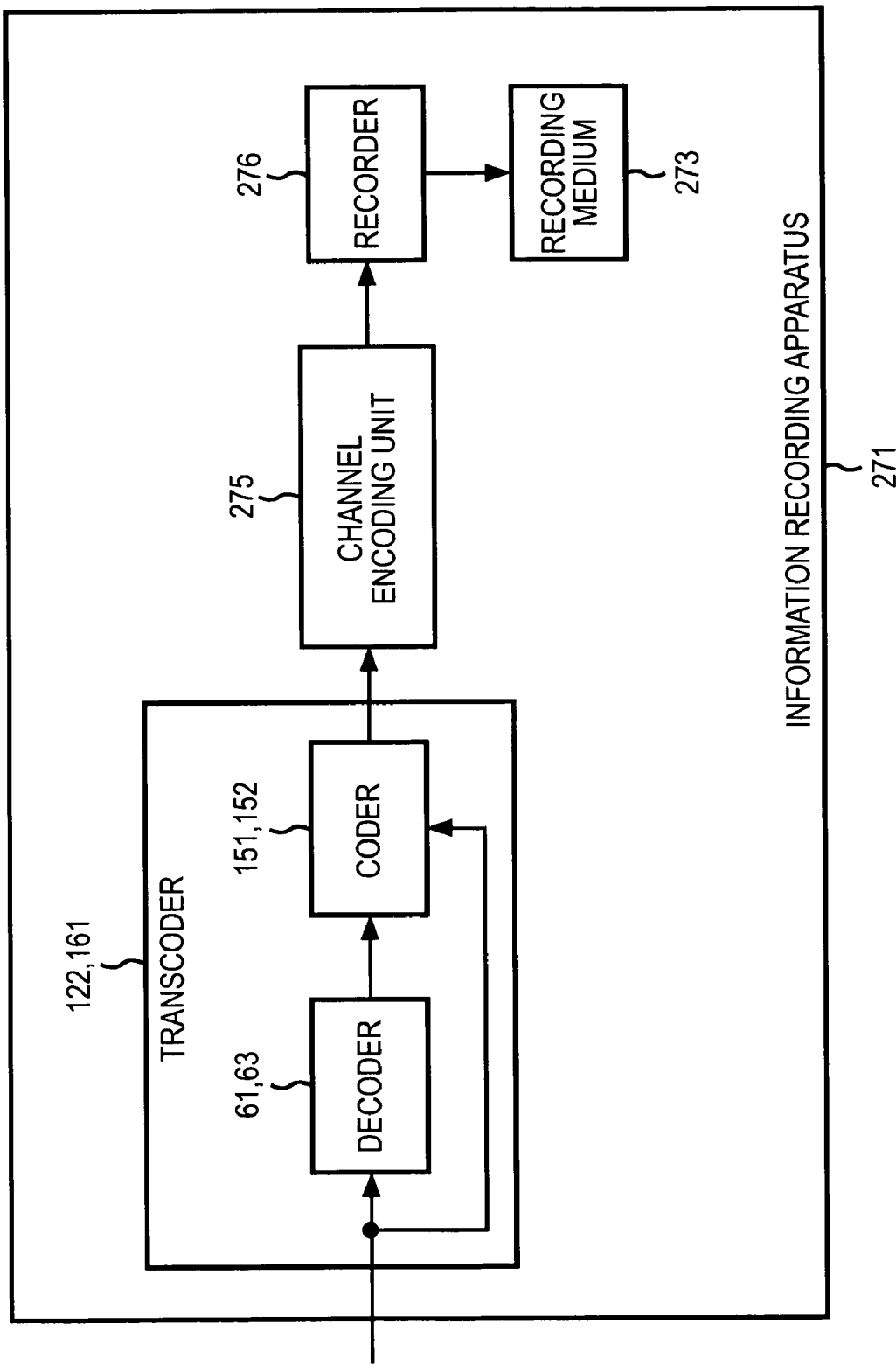
FIG. 13 is a view explaining an arrangement of an information recording apparatus to which the present invention can be applied.

FIG. 13 is a block diagram showing an arrangement of an information recording apparatus 271 to which the present invention is applied.

The information recording apparatus 271 is composed of a transcoder 122, which is provided with the decoder 63 and the coder 151 explained using FIGS. 5 and 6, or a transcoder 161, which is provided with the decoder 61 and the coder 152 (hereinafter, referred to as transcoder 122 or 161), a channel encoding unit 275, and a recorder 276 for recording information to a recording medium 273.

Information input from the outside is processed by the transcoder 122 or 166 likewise the case described above and supplied to the channel encoding unit 275. After the channel encoding unit 275 adds an error correction parity code to a bit stream output from the transcoder 122 or 161, it subjects the bit stream to channel encoding processing using, for example, a NRZI (Non Return to Zero Inversion) modulation system and supplies it to the recorder 276.

The recording medium 273 may be any of, for example, an optical disc such as CD-ROM (Compact Disc-Read Only Memory), DVD (Digital Versatile Disc), and the like, a magnet-optical disc such as MD (Mini-Disc) (Trademark) and the like, a semiconductor memory, a magnetic tape such as a video tape, and the like as long as they can record information.

The recorder 276 can record information supplied thereto to the recording medium 273 in a recording system corresponding to the recording medium 273, For example, when the recording medium 273 is composed an optical disc, the recorder 276 includes a laser for irradiating a laser beam to the recording medium 273, and when the recording medium 273 is composed of a magnetic tape, the recorder 276 includes a magnetic recording head.

Figure 14:
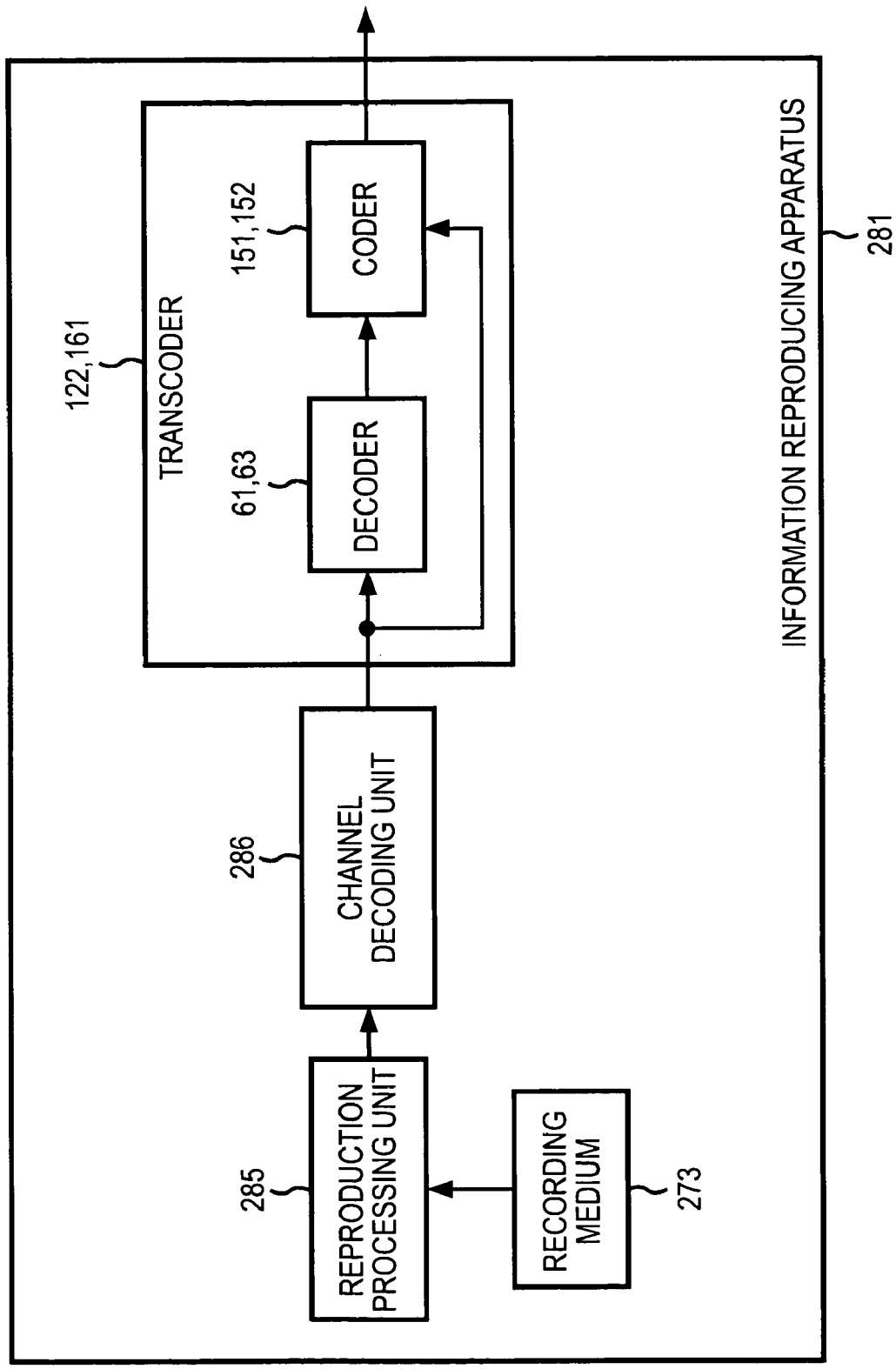
FIG. 14 is a view explaining an arrangement of an information reproducing apparatus to which the present invention can be applied.

Next, FIG. 14 is a block diagram showing an arrangement of an information reproducing apparatus 281 to which the present invention is applied.

The information reproducing apparatus 281 is composed of a reproduction processing unit 285 for reproducing information from the recording medium 273, a channel decoding unit 286, and a transcoder 122 or 161 explained using FIGS. 5 and 6.

The reproduction processing unit 285 can reproduce information recorded to the recording medium 273 by a method corresponding to the recording medium 273 and supply a reproduced signal to the channel decoding unit 286. For example, when the recording medium 273 is composed of an optical disc, the reproduction processing unit 285 includes an optical pick-up, and, when the recording medium 273 is composed of magnetic tape, it includes a magnetic reproduction head.

After the channel decoding unit 286 channel decodes a reproduced signal and subjects it to error correction processing using a parity, it supplies the reproduced signal to the transcoder 122 or 161. The information supplied to the transcoder 122 or 161 is processed thereby likewise the case described above and output therefrom.

Figure 15:
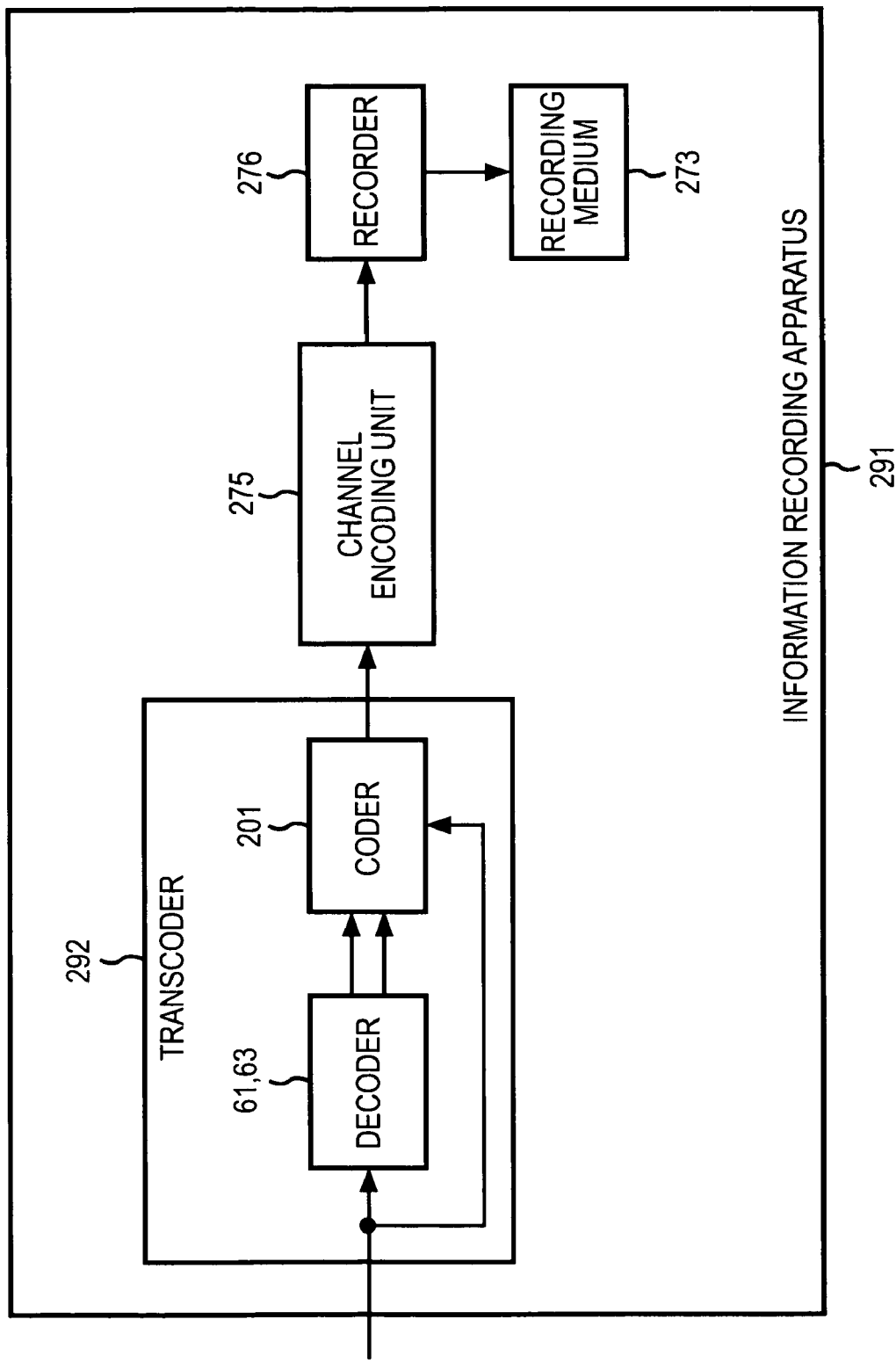
FIG. 15 is a view explaining an arrangement of an information recording apparatus to which the present invention can be applied.

FIG. 15 is a block diagram showing an arrangement of an information recording apparatus 291 to which the present invention is applied.

The information recording apparatus 291 is composed of a transcoder 292, which includes a decoder 61 or 63 and a coder 201 explained using FIG. 10, a channel encoding unit 275, and a recorder 276 for recording information to the recording medium 273.

Information input from the outside is processed by the transcoder 292 likewise the case described above and supplied to the channel encoding unit 275. After the channel encoding unit 275 adds an error correction parity code to a bit stream output from the transcoder 292, it subjects the bit stream to channel encoding processing using, for example, the NRZI (Non Return to Zero Inversion) modulation system, and supplies it to the recorder 276. The recorder 276 records the information supplied thereto to the recording medium 273.

Note that, in the information recording apparatus 291 of FIG. 15, a coding parameter and video data may be recorded at different positions of the recording medium 273.

Figure 16:
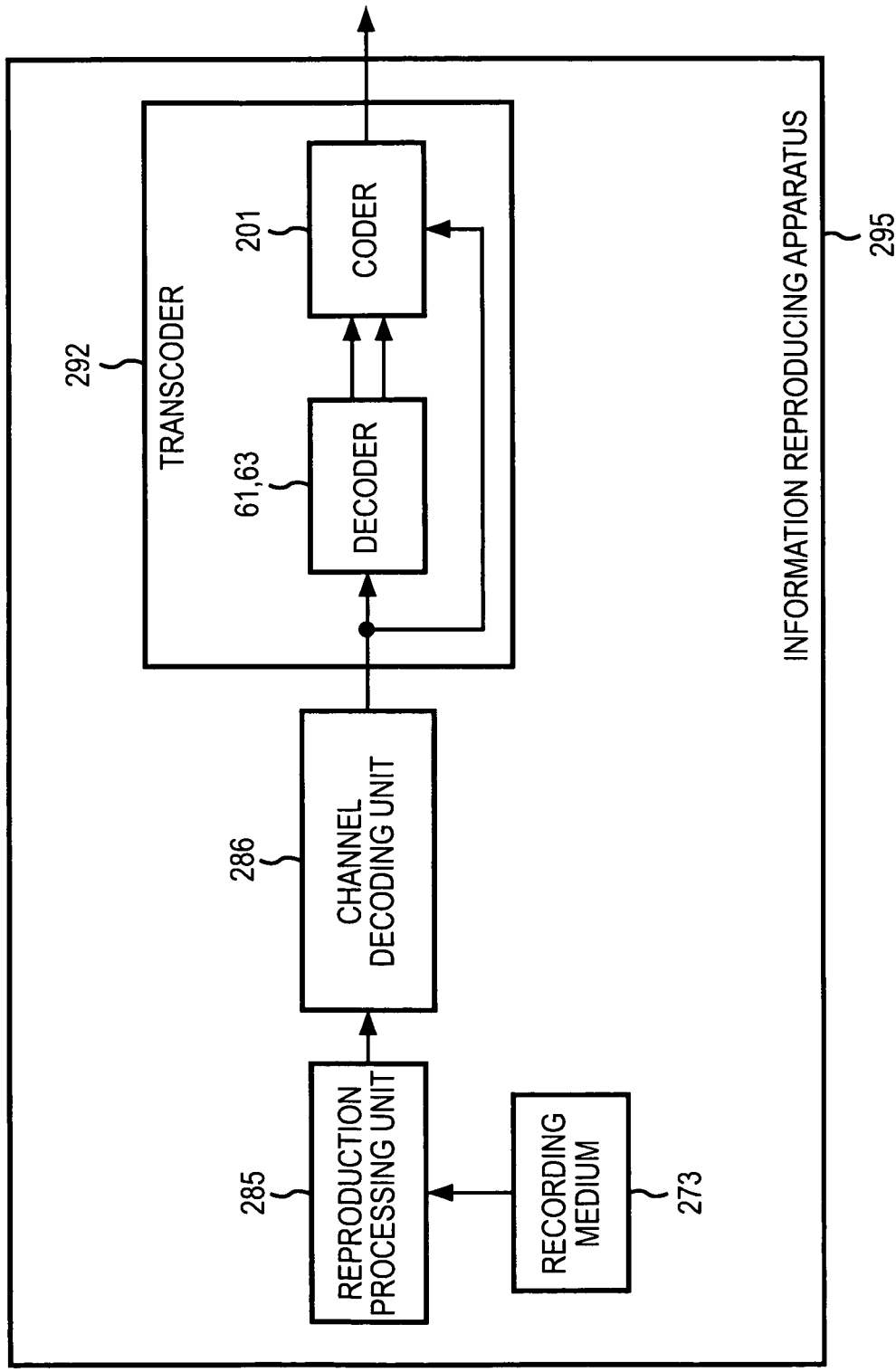
FIG. 16 is a view explaining an arrangement of an information reproducing apparatus to which the present invention can be applied.

Next, FIG. 16 is a block diagram showing an arrangement of an information reproducing apparatus 295 to which the present invention is applied.

The information reproducing apparatus 295 is composed of a reproduction processing unit 285 for reproducing information from the recording medium 273, a channel decoding unit 286, and a transcoder 292 including a decoder 61 or 62, and a coder 201 that is explained using FIG. 10.

The reproduction processing unit 285 reproduces information recorded to the recording medium 273 by a method corresponding to the recording medium 273 and supplies a reproduced signal to the channel decoding unit 286. After the channel decoding unit 286 channel decodes the reproduced signal and subjects it to error correction processing using a parity, the it supplies the reproduced signal to the transcoder 292. The information supplied to the transcoder 292 is processed thereby likewise the case described above and output therefrom.

Although a series of processings described above may be executed by hardware, it may be also executed by software. In this case, each of the transcoders 122 and 131, for example, is composed of a personal computer 301 as shown in FIG. 17.

In FIG. 17, a CPU (Central Processing Unit) 311 executes various kinds of processings according to a program stored in a ROM (Read Only Memory) 312 or a program loaded from a memory unit 318 to a RAM (Random Access Memory) 313. The RAM 313 appropriately stores data and the like which are necessary when the CPU 311 executes the various kinds of the processings.

The CPU 311, the ROM 321, and the RAM 313 are connected to each other through a bus 314. An input/output interface 315 is also connected to the bus 314.

An input unit 316, which is composed of a keyboard, a mouse, and the like, an output unit 317, which is composed of a display, a speaker, and the like, and a memory unit 318 composed of a hard disc and the like, and a communication unit 319, which is composed of a modem, a terminal adapter, and the like, are connected to the input/output interface 315. The communication unit 319 executes communication processing through a network including the Internet.

A drive 320 is also connected to the input/output interface 315 when necessary, and a magnetic disc 331, an optical disc 332, a magnet-optical disc 333, a semiconductor memory, 334, or the like is appropriately mounted on the input/output interface 315, and a computer program read out therefrom is installed on the memory unit 318 when necessary.

When a series of processings are executed by the software, a program constituting the software is installed to a computer to which dedicated hardware is assembled, to a general-purpose personal computer, which can execute various kinds of functions by being installed with various kinds of programs, and the like from the network or a recording medium.

As shown in FIG. 17, the recording medium is composed of a package medium composed of the magnetic disc 331 (including floppy disc) in which a program is stored, the optical disc 332 (including CD-ROM (Compact Disc-Read Only Memory), DVD (Digital Versatile Disc), the magneto-optical disc 333 (including MD (Mini-Disk)(trademark)), the semiconductor memory 334, or the like which is distributed to supply the program to a user in addition to an apparatus main body and in which the program is stored. In addition to the above-mentioned, the recording medium is also composed of the ROM 312, which is supplied to the user by being assembled to the apparatus main body and in which the program is stored, the hard disc included in the memory unit 318, and the like.

Note that, in the specification, the steps that describe the program stored in the recording medium include not only processings executed in the order of the steps in a time-series manner but also processings which are not necessarily executed in the time-series manner and executed in parallel with each other or individually.

Note that, in the specification, the system means an overall apparatus composed of a plurality of apparatuses.

INDUSTRIAL APPLICABILITY

According to an aspect of the present invention, image data can be coded. In particular, in coding processing for transforming stream data from MPEG Long GOP to All Intra or from All Intra to Long GOP, the stream data input to the decoder is output as it is or is coded using parameter information only when the I-picture, which satisfies the predetermined condition, is coded. Accordingly, it can be prevented to allocate an excessive amount of generated code to the I-picture whose image quality cannot be more improved even if it is further allocated with the excessive amount of generated code.

Further, according to another aspect of the present invention, in coding processing when stream data is transformed from MPEG Long GOP to All Intra and from All Intra to Long GOP, in addition to that image data can be transformed, the stream data input to the decoder is output as it is or is coded using parameter information only when the I-picture that satisfies the predetermined condition is coded. Accordingly, it can be prevented to allocate an excessive amount of generated code to the I-picture whose image quality cannot be more improved even if it is further allocated with it.

The invention claimed is:

1. An image processing apparatus for coding image data of a base band or image data, which is coded up to a midstep, comprising:

acquisition means for acquiring previously-executed image coding information; and control means for controlling the image data of the base band or the image data coded up to the midstep, wherein, when a coding picture type is a predetermined picture type, the control means determines whether the previously-executed image coding information is to be used to the coding processing based on the previously-executed image coding information and on a condition as to the coding processing executed to the image data by the image processing apparatus, and wherein whether the acquired previously-executed image coding information is used is determined based on at least whether the image data is an I-type and whether a coding phase of a past macro block agrees with that of a coding phase of a current macro block.

2. An image processing apparatus according to claim 1, wherein the control means determines whether the previously-executed image coding information is to be used based on whether the amount of generated code in the decoding described in the previously-executed image coding information is equal to or less than a predetermined value.

3. An image processing apparatus according to claim 1, further comprising:

output means that is supplied with first coding data supplied by another image processing apparatus that decodes the image data and that is supplied with second coding data created by the coding processing and that outputs the first coding data or the second coding data, wherein the control means further controls the output means and causes the output means to output the first coding data when the phase of the macro block in the past coding described in the previously-executed image coding information agrees with the phase of the macro block of the coding processing, the amount of the generated code in the decoding described in the previously-executed image coding information is equal to or less than the predetermined value, and the position and the magnitude of an image frame in the past coding described in the previously-executed image coding information agree with those of the coding processing.

4. An image processing method of an image processing apparatus for coding image data of a base band or image data, which is coded up to a midstep comprising:

acquiring previously-executed image coding information; and determining, when a coding picture type is a predetermined picture type, whether the previously-executed image coding information is to be used to the coding processing based on the previously-executed image coding information and on a condition as to the coding processing executed to the image data by the image processing apparatus, wherein whether the acquired previously-executed image coding information is used is determined based on at least whether the image data is an I-type and whether a coding phase of a past macro block agrees with that of a coding phase of a current macro block.

5. A recording medium storing a program that, when executed by a computer, causes the computer to execute coding processing of image data of a base band or image data, which is coded up to a midstep, wherein the program comprises:

a first determination step for determining whether a coding picture type is a predetermined picture type;

a comparison step for comparing, when it is determined by the processing at the first determination step that the picture type is the predetermined picture type, previously-executed image coding information with a condition as to the coding processing; and a second determination step for determining whether the previously-executed image coding information is to be used to the coding processing based on a result of comparison of the processing executed at the comparison step, and wherein whether the acquired previously-executed image coding information is used is determined based on at least whether the image data is an I-type and whether a coding phase of a past macro block agrees with that of a coding phase of a current macro block.

6. An image processing apparatus for transforming image data, comprising:

decoding means for decoding the image data perfectly or imperfectly; and coding means for coding the image data of a base band or the image data, which is coded up to a midstep, wherein the coding means comprises:

acquisition means for acquiring previously-executed image coding information; and control means for controlling the coding processing of the image data of the base band or the image data coded up to the midstep, wherein the control means determines, when a coding picture type is a predetermined picture type, whether the previously-executed image coding information is to be used to the coding processing based on previously-executed image coding the information acquired by the acquisition means and on a condition as to the coding processing, and wherein whether the acquired previously-executed image coding information is used is determined based on at least whether the image data is an I-type and whether a coding phase of a past macro block agrees with that of a coding phase of a current macro block.

7. An image processing method of an image processing apparatus for transforming image data, comprising:

a decoding step for decoding the image data; and a coding step for coding the image data of a base band or the image data, which is coded up to a midstep, wherein the processing at the coding step comprises:

a first determination step for determining whether a coding picture type is a predetermined picture type;

a comparison step for comparing, when it is determined by the processing at the first determination step that the picture type is the predetermined picture type, previously-executed image coding information with a condition as to the coding processing; and a second determination step for determining whether the previously-executed image coding information is to be used to the coding processing based on a result of comparison of the processing executed at the comparison step, and wherein whether the acquired previously-executed image coding information is used is determined based on at least whether the image data is an I-type and whether a coding phase of a past macro block agrees with that of a coding phase of a current macro block.

8. A recording medium storing a program that, when executed by a computer, causes the computer to execute processing for transforming image data, wherein the program comprises:

a decoding step for decoding the image data; and a coding step for coding the image data of a base band or the image data, which is coded up to a midstep, wherein the processing at the coding step comprises:

a first determination step for determining whether a coding picture type is a predetermined picture type;

a comparison step for comparing, when it is determined by the processing at the first determination step that the picture type is the predetermined picture type, acquired previously-executed image coding information with a condition as to the coding processing; and a second determination step for determining whether the previously-executed image coding information is to be used to the coding processing based on a result of comparison of the processing executed at the comparison step, and wherein whether the acquired previously-executed image coding information is used is determined based on at least whether the image data is an I-type and whether a coding phase of a past macro block agrees with that of a coding phase of a current macro block.

9. An image recording apparatus for recording image data, comprising:

decoding means for decoding the image data;

coding means for coding the image data of a base band or the image data, which is coded up to a midstep; and recording control means for controlling the record of the image data coded by the coding means, wherein the coding means comprises:

acquisition means for acquiring previously-executed image coding information; and control means for controlling the coding processing of the image data of the base band or the image data coded up to the midstep, and wherein, when a coding picture type is a predetermined picture type, the control means determines whether the previously-executed image coding information is to be used to the coding processing based on the previously-executed image coding information acquired by the acquisition means and on a condition as to the coding processing, and wherein whether the acquired previously-executed image coding information is used is determined based on at least whether the image data is an I-type and whether a coding phase of a past macro block agrees with that of a coding phase of a current macro block.

10. An information recording apparatus according to claim 9, wherein the recording control means controls recording of the image data coded by the coding means and previously-executed image coding information at different positions.

11. An image recording method of an image recording apparatus for recording image data, comprising:

a decoding step implemented by decoding means for decoding the image data;

a coding step implemented by coding step for coding the image data of a base band or the image data, which is coded up to a midstep; and a recording control step implemented by controlling means for controlling the recording of the image data coded by the processing at the coding step, wherein the processing at the coding step comprises:

a first determination step for determining whether a coding picture type is a predetermined picture type;

a comparison step for comparing, when it is determined by the processing at the first determination step that the picture type is the predetermined picture type, acquired previously-executed image coding information with a condition as to the coding processing; and a second determination step for determining whether the previously-executed image coding information is to be used to the coding processing based on a result of comparison of the processing executed at the comparison step, and wherein whether the acquired previously-executed image coding information is used is determined based on at least whether the image data is an I-type and whether a coding phase of a past macro block agrees with that of a coding phase of a current macro block.

12. An image reproducing apparatus for reproducing image data, comprising:

reproduction means for reproducing the image data recorded to a predetermined recording medium;

decoding means for decoding the image data reproduced by the reproduction means; and coding means for coding the image data of a base band or the image data, which is coded up to a midstep, wherein the coding means comprises:

acquisition means for acquiring previously-executed image coding information; and control means for controlling the coding processing of the image data of the base band or the image data coded up to the midstep, and wherein the control means determines, when a coding picture type is a predetermined picture type, whether the previously-executed image coding information is to be used to the coding processing based on the previously-executed image coding information acquired by the acquisition means and on a condition as to the coding processing, and wherein whether the acquired previously-executed image coding information is used is determined based on at least whether the image data is an I-type and whether a coding phase of a past macro block agrees with that of a coding phase of a current macro block.

13. An information reproducing method of an information reproducing apparatus for reproducing image data, comprising:

a reproduction step implemented by reproduction means for reproducing the image data recorded to a predetermined recording medium;

a decoding step implemented by decoding means for decoding the image data reproduced by the reproduction means; and a coding step implemented by coding means for coding the image data of a base band or the image data, which is coded up to a midstep, wherein the processing at the coding step comprises:

a first determination step for determining whether a coding picture type is a predetermined picture type;

a comparison step for comparing, when it is determined by the processing at the first determination step that the picture type is the predetermined picture type, acquired previously-executed image coding information with a condition as to the coding processing; and a second determination step for determining whether the previously-executed image coding information is to be used to the coding processing based on a result of comparison of the processing executed at the comparison step, and wherein whether the acquired previously-executed image coding information is used is determined based on at least whether the image data is an I-type and whether a coding phase of a past macro block agrees with that of a coding phase of a current macro block.

* * * * *